(12) United States Patent
Itoh et al.

(10) Patent No.: US 7,650,567 B2
(45) Date of Patent: Jan. 19, 2010

(54) RECEPTION APPARATUS AND INFORMATION BROWSING METHOD

(75) Inventors: Tomoaki Itoh, Tokyo (JP); Junichi Sato, Machida (JP); Takao Yamaguchi, Neyagawa (JP); Ichiro Takei, Tokyo (JP); Daiji Ido, Tokyo (JP)

(73) Assignee: Panasonic Corporation, Osaka (JP)

( * ) Notice: Subject to any disclaimer, the term of this patent is extended or adjusted under 35 U.S.C. 154(b) by 229 days.

(21) Appl. No.: 10/547,315

(22) PCT Filed: Feb. 24, 2004

(86) PCT No.: PCT/JP2004/002125

§ 371 (c)(1),
(2), (4) Date: Aug. 31, 2005

(87) PCT Pub. No.: WO2004/081799

PCT Pub. Date: Sep. 23, 2004

(65) Prior Publication Data
US 2006/0168517 A1 Jul. 27, 2006

(30) Foreign Application Priority Data
Mar. 10, 2003 (JP) ............................ 2003-064120

(51) Int. Cl.
 G06N 3/00 (2006.01)
(52) U.S. Cl. ..................................................... 715/243
(58) Field of Classification Search ................. 715/513, 715/517, 523, 530, 234, 243, 254, 255
See application file for complete search history.

(56) References Cited

U.S. PATENT DOCUMENTS

| | | | |
|---|---|---|---|
| 6,081,837 A * | 6/2000 | Stedman et al. ............. | 709/219 |
| 6,345,279 B1 | 2/2002 | Li et al. | |
| 6,549,514 B1 * | 4/2003 | Kilkki et al. ................ | 370/231 |
| 7,366,241 B2 | 4/2008 | Matsui | |
| 2002/0129373 A1 * | 9/2002 | Noda et al. ................... | 725/90 |
| 2003/0152032 A1 * | 8/2003 | Yanagihara et al. ...... | 370/236.1 |
| 2004/0117748 A1 * | 6/2004 | Tester .......................... | 716/11 |

FOREIGN PATENT DOCUMENTS

| | | |
|---|---|---|
| JP | 11 346198 | 12/1999 |
| JP | 2000-020510 | 1/2000 |
| JP | 2001-134518 | 5/2001 |

(Continued)

OTHER PUBLICATIONS

W3C, "Synchronized Multimedia Integration Language (SMIL 2.0)," Aug. 7, 2001, Chapters 1-14.*

(Continued)

*Primary Examiner*—Kyle R Stork
(74) *Attorney, Agent, or Firm*—Greenblum & Bernstein, P.L.C.

(57) ABSTRACT

The present invention allows the transmitting side to transmit a plurality of pieces of layout information that determines a display layout of at least one media and media data making up this layout information and allows the receiving side to receive the layout information and media making up this layout information transmitted from the transmitting side, select one out of a plurality of different pieces of layout information based on a reception state of this media and represent the media using the selected layout information.

18 Claims, 23 Drawing Sheets

FOREIGN PATENT DOCUMENTS

| | | |
|---|---|---|
| JP | 2002-297538 | 10/2002 |
| JP | 2002-351781 | 12/2002 |
| JP | 2003-032690 A | 1/2003 |
| JP | 2004-054712 | 2/2004 |
| WO | 01 53962 | 7/2001 |

OTHER PUBLICATIONS

English Language Abstract of JP 2002-297538.
English Language Abstract of JP 2000-20510.
English Language Abstract of JP 2001-134518.
English Language Abstract of JP 2002-351781.
English Language Abstract of JP 2004-054712.
Handley et al., "SDP: Session Description Protocol," RFC 2327—Standards Track, Apr. 1998.
W3C, Synchronized Multimedia Integration Language (SMIL 2.0) retrieved from http://www.w3.org/TR/2001/REC-smil20-20010807/.
U.S. Appl. No. 10/541,384 to Takei et al., filed Jul. 1, 2005.
U.S. Appl. No. 10/548,081 to Sato et al., filed Sep. 6, 2005.
English Language Abstract of JP 11-346198.
English language Abstract of JP 2003-032690 A.

* cited by examiner

```
① <smil>
② <head>
③ <layout>
④   <root-layout width="320" height="480" />
⑤   <region id="v" top="5" />
⑥   <region id="t" top="10" />
⑦   <region id="i" top="20" />
⑧ </layout>
⑨ </head>
⑩ </body>
⑪ <par>
⑫ <video region="v" src="rtsp://server/sample.mp4/track-ID=1 begin="3s" end="20s"/>
⑬   <audio src="rtsp://server/sample.mp4/track-ID=2 begin="3s" end="20s"/>
⑭   <text region="t" src="http://server/text.txt" dur="10s" />
⑮   <image region="i" src="http://server/image.jpg" dur="10s" />
⑯ </par>
⑰ </body>
⑱ </smil>
```

FIG. 1
(PRIOR ART)

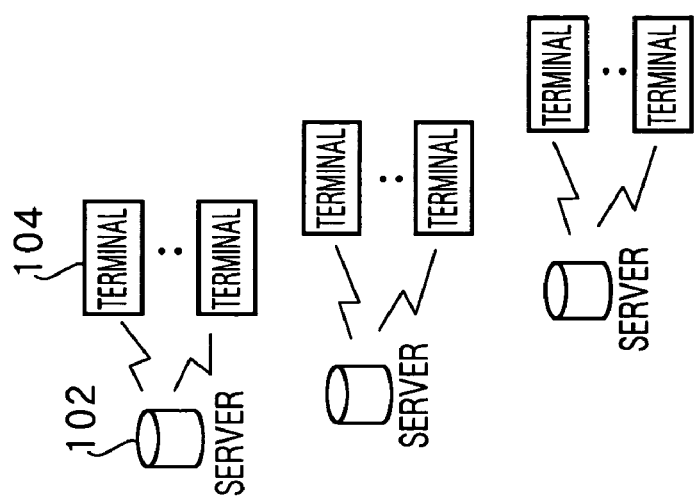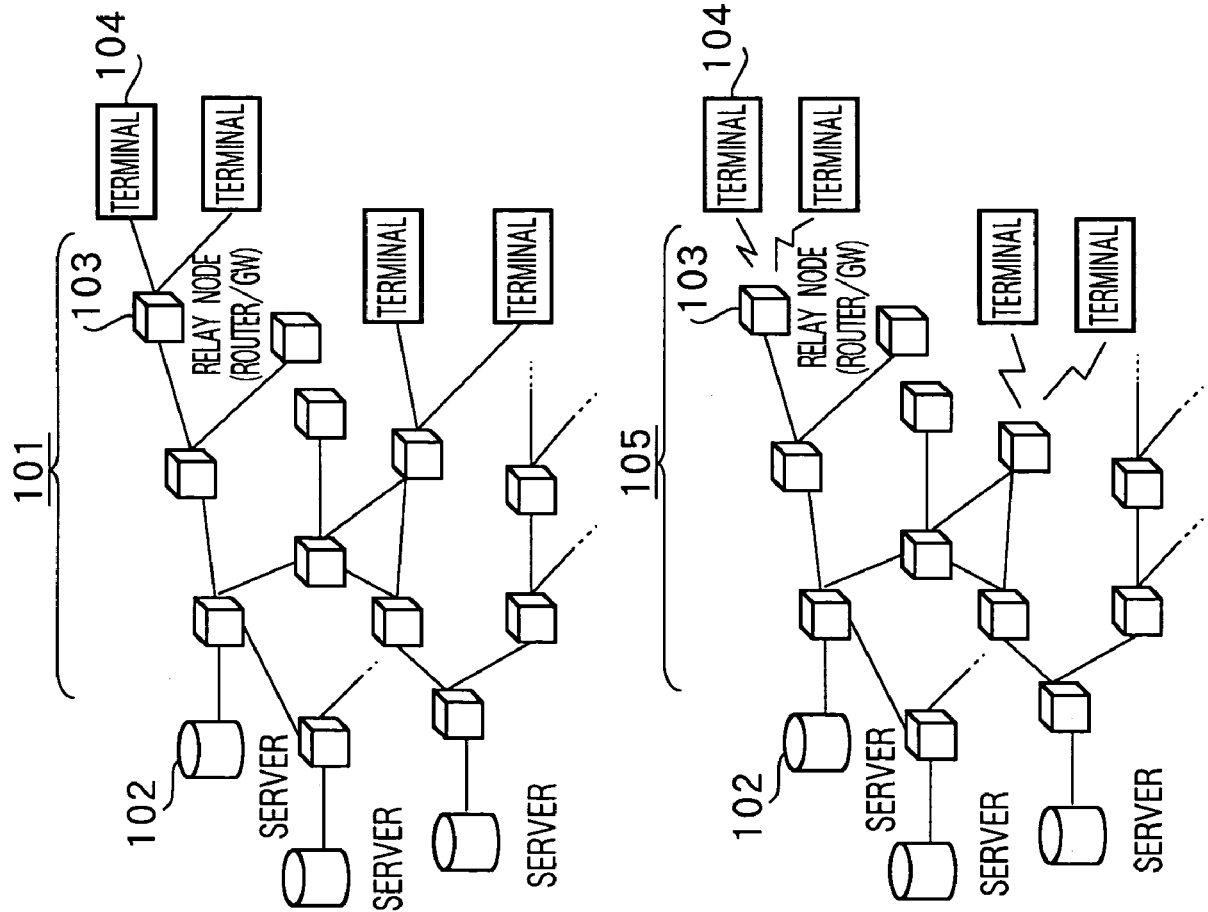

SESSION INFORMATION

- 403 — TITLE : Session
- 404 — SESSION NUMBER : 13579
- 405 — TRANSMISSION START/END TIME : 2003/2/20 10:00:00 – 2003/2/20 11:00:00
- 406 — DESTINATION ADDRESS : 224.10.20.30

402

MEDIA INFORMATION

| FILE NAME | TRANSMISSION NAME (408) | TYPE OF MEDIA (409) | MANDATORY FLAG (410) | TRANSMISSION PERIOD /ITERATION COUNT (411) |
|---|---|---|---|---|
| HTML1 | text1 | Text/plain | 0 | 1 SEC |
| Image1 | image1 | Image/JPEG | 0 | 1 SEC |
| Layout1 | — | Application/SMIL | 1 | 1 SEC |
| Image1 | image1 | Image/JPEG | 0 | 5 SEC |
| Layout2 | — | Application/SMIL | 1 | 5 SEC |
| Audio1 | audio1 | Audio/AAC | 1 | INFINITE |
| Video1 | video1 | Video/MPEG4-ES | 1 | INFINITE |
| Layout3 | — | Application/SMIL | 1 | 10 SEC |

901 LAYOUT INFORMATION TABLE

| PRIORITY (903) | COMPONENT MEDIA (904) | MANDATORY FLAG (905) |
|---|---|---|
| 3 | text1 | 0 |
|  | image1 | 0 |
| 2 | text1 | 0 |
|  | image1 | 0 |
|  | image2 | 1 |
| 1 | text1 | 0 |
|  | image2 | 0 |
|  | audio1 | 1 |
|  | video1 | 1 |

902 MEDIA TABLE

| MEDIA (906) | PRIORITY (907) | RECEPTION COMPLETION FLAG (908) | CONSECUTIVE RECEPTION POSSIBILITY FLAG (909) |
|---|---|---|---|
| text1 | – | 1 | 1 |
| image1 | 2 | 1 | 1 |
| image2 | 1 | 0 | 0 |
| audio1 | – | 0 | 0 |
| video1 | 2 (I) | 0 | 0 |
|  | 1 (I+P) |  |  |

319

1800 m=text 49234 RTP/AVP 102
a=rtpmap:102 plain/8000
a=namemap:102 text1        }  1801 m=image 49236 RTP/AVP 104 105
a=rtpmap:104 jpeg/8000
a=rtpmap:105 jpeg/8000
a=namemap:104 image1
a=namemap:105 image1
a=prioritymap:104 1
a=prioritymap:105 2        }  1802 m=image 49236 RTP/AVP 109
a=rtpmap:109 gif/8000
a=namemap:109 image2       }  1803 m=video 49236 RTP/AVP 106 107
a=rtpmap:106 MPEG4-ES/90000/I
a=rtpmap:107 MPEG4-ES/90000/P
a=namemap:106 video1
a=namemap:107 video1       }  1804 m=audio 49238 RTP/AVP 108
a=rtpmap:108 AMR/8000
a=namemap:108 audio1       }  1805 m=text 49232 RTP/AVP 99 100 101
a=rtpmap:99 xml/8000
a=rtpmap:100 xml/8000
a=rtpmap:101 xml/8000
a=prioritymap:99 1
a=prioritymap:100 2
a=prioritymap:101 3
a=mediamap:101 ; 102 104/105
1807 — a=mediamap:100 109 ; 104/105 102
a=mediamap:99 107 108 ; 104/105 106 102   }  1806

FIG. 8

```
<smil>
<head>
<region id="jpeg" top="50" left="10" width="120" height="50" />
<region id="text" top="120" left="30" width="100" height="20" />
</head>
<body>
<par>
    <text src="text1" region="text" display="mandatory" />      1901
    <image src="image1" region="image" display="optional"/>     1902
</par>
</body>
</smil>
```

```
v=0
o=mhandley 2890844526 2890842807 IN IP4 126. 16. 64. 4
s=SDP Seminar
c=IN IP4 244. 2. 17. 12/127
a=priority:2  ──── 2103
t=2873397496 2873404696
m=text 49234 RTP/AVP 102
a=rtpmap:102 plain/8000
a=namemap:102 text1
m=image 49236 RTP/AVP 104
a=rtpmap:104 jpeg/8000
a=namemap:104 image1
m=image 49236 RTP/AVP 109
a=rtpmap:109 gif/8000
a=namemap:109 image2
m=text 49232 RTP/AVP 100       ⎫
a=rtpmap:100 xml/8000          ⎬ 2105
a=mediamap:100 109 ; 104 102   ⎭
```
2101

```
v=0
o=mhandley 2890844526 2890842807 IN IP4 126. 16. 64. 4
s=SDP Seminar
c=IN IP4 244. 2. 17. 12/127
a=priority:3  ──── 2104
t=2873397496 2873404696
m=text 49234 RTP/AVP 102
a=rtpmap:102 plain/8000
a=namemap:102 text1
m=image 49236 RTP/AVP 104
a=rtpmap:104 jpeg/8000
a=prioritymap:104 1
m=text 49232 RTP/AVP 101    ⎫
a=rtpmap:101 xml/8000       ⎬ 2106
a=mediamap:101 ; 104 102    ⎭
```
2102

FIG.11

RECEPTION APPARATUS AND INFORMATION BROWSING METHOD

TECHNICAL FIELD

The present invention relates to a reception apparatus and an information browsing method which receives and browses contents including a media such as video, speech, text or still image and contents layout information.

BACKGROUND ART

As a method for integrating contents including text, still image, video and speech and describing their spatial and temporal arrangements, a technology called "SMIL (Synchronized Multimedia integration Language)" which is being standardized by the W3C (World Wide Web Consortium) is currently available.

SMIL is a description language similar to a hyper text description language HTML which is currently widely spread over the Internet and is a description language suitable for distribution of multi-media data including video.

A description example of an SMIL file will be explained using FIG. 1.

Information from <layout> on the third line to </layout> on the eighth line of the description shown in FIG. 1 corresponds to information on a spatial layout of contents.

Information from <par> on the 11th line to </par> on the 16th line corresponds to time information on representation of the contents.

Regions v, t and i in which video, text and still image are arranged are defined from the fifth to seventh lines.

The 12th to 14th lines define time information on representation of the video, speech, text and still image respectively. "src=" included in the 12th to 14th lines specifies a URL for acquiring the media and in this example, it specifies that video and speech are acquired using a RTSP (RealTime Streaming Protocol, Internet Draft RFC2326) protocol, while text and still image are acquired using an HTTP protocol.

Furthermore, "region=" included in the 12th or 14th, 15th line specifies the position at which the media is displayed and corresponds to the regions specified on the fifth to seventh lines.

For example, since the text data specified on the 14th line has region id="t", the text data is displayed in the region specified on the sixth line.

The line number is given for convenience of explanation and is not described in an actual SMIL file.

Next, the method whereby a client represents contents described in SMIL saved on a server over a network will be explained using FIG. 2.

A client 704, a terminal which receives contents uses a protocol such as HTTP to acquire an SMIL file describing contents from a server 1 (701) over a network such as the Internet. After acquiring the SMIL file, the client 704 interprets the SMIL file and acquires various media described therein, that is, text, still image, video, speech, etc., from the server.

More specifically, the client 704 acquires video data and speech data from the server 2 (702) and acquires text data and still image data from the server 3 (703).

Then, based on space information and time information described in the acquired SMIL file, the client 704 represents the respective described media at appropriate positions and appropriate times.

However, when contents are described using SMIL, the client 704 cannot know the type of the multi-media data described in the SMIL file beforehand.

Furthermore, depending on the capability of representing the multi-media data of the client 704, there is a possibility that all types of the multi-media data described in the SMIL file may not be decoded.

In order to solve this problem, a method whereby the client 704 acquires a decoder corresponding to the capability of representing the multi-media data is proposed (e.g., the method described in the Unexamined Japanese Patent Publication No. 2002-297538).

According to this method, even when the reception terminal does not have the capability of representing the multi-media data specified by scenario data of SMIL, etc., the reception terminal is allowed to acquire the decoder as appropriate. This allows the reception terminal to decode all estimated types of multi-media data.

However, the above described media distribution method involves the following problems.

The above described media distribution method does not take any transmission state of the multi-media data into consideration at all. That is, no consideration is given to a case where the reception terminal cannot receive the multi-media data.

Especially, when media are distributed through a radio transmission path, it may or may not be possible to transmit the multi-media data specified by SMIL to the reception terminal depending on the band and error rate of the varying communication path.

For example, in a third-generation cellular phone system, a reception terminal located far from a base station may be able to receive media data at a low bit rate, while a reception terminal located close to a base station may be able to receive media data at a high bit rate. In such a transmission path, there may be a case where the reception terminal located far from the base station has difficulty in receiving large-size data such as video data and can only receive media such as text and still image.

In this way, when the multi-media data specified by SMIL includes data that cannot be received, even if the reception apparatus can decode all types of multi-media data specified by the transmitting side, there is a problem that it is not possible to display the contents specified by SMIL appropriately.

DISCLOSURE OF INVENTION

It is an object of the present invention, when a reception terminal displays contents consisting of various transmitted media such as video, speech, still image and text, to allow the reception terminal to display the contents in a mode appropriate for a state in which the media are received.

The present invention allows a transmitting side to transmit a plurality of pieces of layout information which determines a display layout of at least one media and media data making up this layout information and allows a receiving side to receive the layout information and the media making up the layout information transmitted from the transmitting side, select one out of the plurality of different pieces of layout information based on a reception state of this media and represent the media using the selected layout information.

This allows the receiving side to select layout information appropriate for the reception state of the media and display the received media using the selected layout information.

BRIEF DESCRIPTION OF DRAWINGS

FIG. 1 illustrates an example of description of an SMIL file;

FIG. 3A is a first diagram illustrating a media distribution system according to Embodiment 1 of the present invention;

FIG. 3B is a second diagram illustrating the media distribution system according to Embodiment 1;

FIG. 3C is a third diagram illustrating the media distribution system according to Embodiment 1;

FIG. 6 illustrates a program table stored in the server according to Embodiment 1;

FIG. 7 illustrates the configuration of a reception control table according to Embodiment 1;

FIG. 8 is a diagram describing the program information according to Embodiment 1 according to SDP (Session Description Protocol, IETF Internet Draft RFC2327);

FIG. 9 is a diagram describing the layout information according to Embodiment 1 in SMIL;

FIG. 11 illustrates an example where the program information according to Embodiment 1 is transmitted according to SDP;

BEST MODE FOR CARRYING OUT THE INVENTION

Embodiment 1

Figure 2:
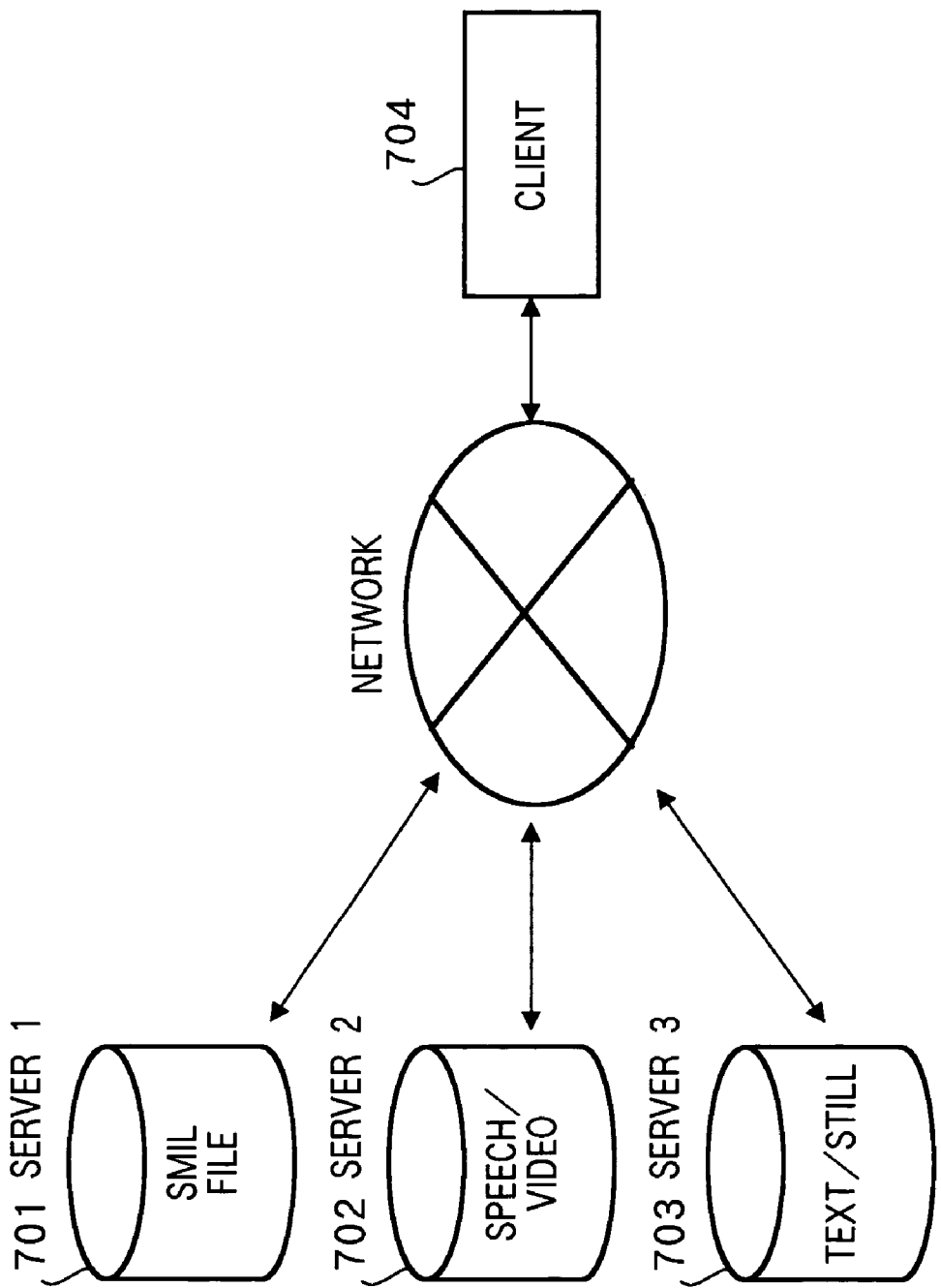
FIG. 2 illustrates a method whereby a client represents contents saved in a server.

With reference now to the attached drawings, Embodiment 1 of the present invention will be explained below.

First, the mode of use of a communication network according to Embodiment 1 will be explained using FIG. 3A to FIG. 3C. FIG. 3A to FIG. 3C show a media distribution system according to Embodiment 1.

As shown in FIG. 3A, the media distribution system according to Embodiment 1 is designed in such a way that contents distributed from a server 102 which is a transmission apparatus are received by a reception terminal 104 over a communication network 101.

The server 102 transmits contents targeted at various media such as video, speech, music, text, still image, layout information and program. Furthermore, the server 102 transmits program information and program data as contents.

The program information is data describing reception conditions such as a summary of a program, broadcasting start/end time, communication port used for broadcasting (which corresponds to a channel in TV broadcasting, and more specifically refers to a destination IP address and port number).

Furthermore, as a program information description method, for example, SDP (Session Description Protocol) is used.

Furthermore, the program data is media such as video, speech, music, text, still image, program and layout information for displaying these items combined.

As a layout information description method, for example, SMIL (Synchronized Multimedia integration Language) or JAVA (R) is used.

Details of SMIL are described in http://www.w3.org/TR/smil20/and details of SDP are described in http://www.ietf.org/rfc/rfc2327.txt.

The reception terminal 104 is a terminal having different display resolutions or processing capacities such as cellular phone, TV, PDA and personal computer. The reception terminal 104 receives program information transmitted from the server 102 first and then opens a reception channel for receiving program data described in the program information and receives the program data. Then, the reception terminal 104 represents the program corresponding to the program information.

The reception terminal 104 can also receive contents from a plurality of servers which distribute programs simultaneously. Furthermore, the reception terminal 104 may also have a capability to have connections not only to a single transmission path but to a plurality of transmission paths simultaneously.

The communication network 101 may be a cable network (e.g., ADSL, ISDN, ATM, FTTH) or wireless network (e.g., cellular phone, wireless LAN).

Furthermore, the communication devices are mutually connected via a relay node 103 such as a router or gateway (GW).

The relay node 103 is provided with a broadcast or multi-cast function and the relay node 103 can replicate data packets.

Furthermore, the contents transmission method may include a one-to-one communication between the server 102 and reception terminal 104 or one-to-N communications between the server 102 and reception terminals 104 using a broadcast or multi-cast function.

The program information or program data may be transmitted using the same transmission path or different transmission paths. For example, program information may be transmitted using a broadcasting network and program data may be transmitted using a communication network.

Furthermore, Embodiment 1 may also be provided with a communication network 105 including a cable network and wireless network connected to each other as shown in FIG. 3B.

As shown in FIG. 3C, Embodiment 1 may have a communication mode in which servers 102 are located at various positions, data are broadcast to neighboring regions and reception terminals 104 receive the data. In such a communication mode, BlueTooth or wireless LAN, etc., may be used as a transmission protocol.

Furthermore, the connection path between the server 102 and reception terminal 104 is not limited to the communication network 101 but may also be a broadcasting network (e.g., digital terrestrial broadcasting, digital satellite broadcasting) or a system configuration which merges a broadcasting network and communication network.

On the other hand, in the mode as shown in FIG. 3B in which contents are broadcast to mobile reception terminals 104 such as cellular phones, there is also a demand for broadcasting contents which may differ from one region to another in which reception terminals 104 exist. However, when the server 102 broadcasts or multi-casts contents to a plurality of reception terminals 104, it is not easy to change broadcasting contents according to their positions.

Therefore, in order to realize broadcasting according to positions, Embodiment 1 realizes a one-to-one communication between the server 102 and relay node 103 (cable network section) in FIG. 3B, for example, and distributes contents between the relay node 103 and reception terminal 104 using a broadcast function over a wireless network.

Thus, the relay node 103 which realizes the broadcast function does not broadcast packets across other different relay nodes 103.

Next, differences in results of representing programs according to media that can be received at the reception terminal 104 will be explained using FIG. 4A to FIG. 4D. FIG. 4A to FIG. 4D illustrate differences in results of representing programs according to the physical or logical distance from the relay node 103 at the reception terminal 104.

In this example, suppose the server 102 is transmitting text data (201), low resolution still image data 1 (202), still image data 2 (203), MPEG4 video stream data (204, 206) and high resolution still image data 1 (205).

The MPEG4 video stream data 204, 206 are the same video encoded with high resolution and low resolution. The MPEG4 video stream data 204 is encoded with low resolution, while the MPEG4 video stream data 206 is encoded with high resolution. Furthermore, suppose the server 102 is transmitting MPEG4 video stream data 204 as in-frame coded frame (I frame) data and MPEG4 video stream data 206 as inter-frame coded frame (P frame) data.

Figure 4A:
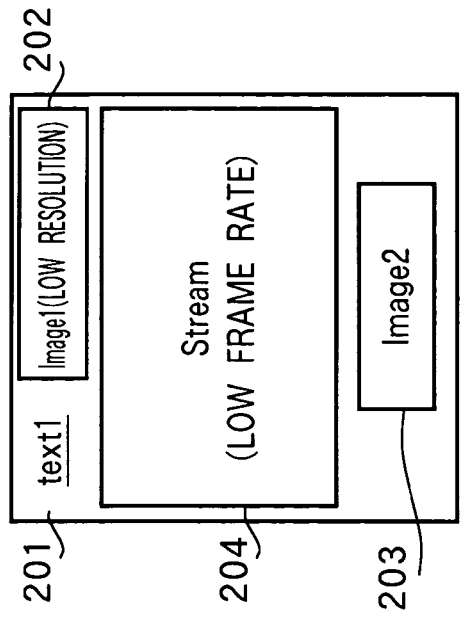
FIG. 4A is a first diagram illustrating a difference in the result of representation of a program according to a physical or logical distance from a relay node at the reception terminal according to Embodiment 1.

The display result shown in FIG. 4A is one when the reception terminal 104 can receive the text data 201 and low resolution still image data 1 (202). In this case, the text data 201 and low resolution still image data 1 (202) are displayed on the reception terminal 104.

Figure 4B:
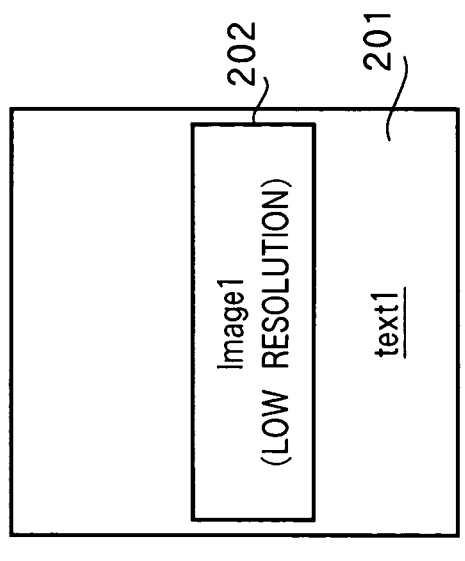
FIG. 4B is a second diagram illustrating a difference in the result of representation of a program according to a physical or logical distance from a relay node at the reception terminal according to Embodiment 1.

The display result shown in FIG. 4B is a representation result of a program when the reception terminal 104 can receive still image data 2 (203) in addition to the text data 201 and low resolution still image data 1 (202). In this case, the reception terminal 104 adopts a layout appropriate for displaying text data 201, low resolution still image data 1 (202) and still image data 2 (203).

Figure 4C:
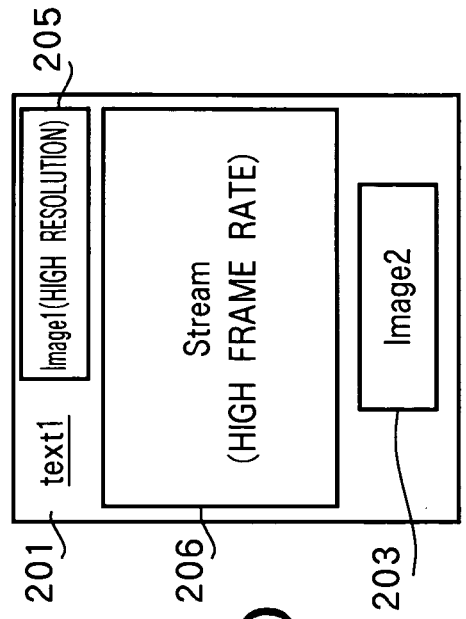
FIG. 4C is a third diagram illustrating a difference in the result of representation of a program according to a physical or logical distance from a relay node at the reception terminal according to Embodiment 1.

The display result shown in FIG. 4C is a representation result of a program when the reception terminal 104 can receive MPEG4 video stream data 204 in addition to the text data 201, low resolution still image data 1 (202) and still image data 2 (203). In this case, the reception terminal 104 adopts a layout in which the MPEG4 video stream data 204 is placed in the center and the text data 201, still image data 1 (202) and still image data 2 (203) are displayed in compressed sizes.

Figure 4D:
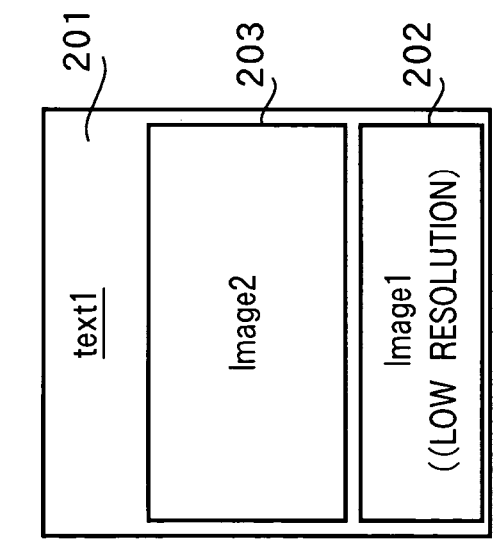
FIG. 4D is a fourth diagram illustrating a difference in the result of representation of a program according to a physical or logical distance from a relay node at the reception terminal according to Embodiment 1.

The display result shown in FIG. 4D is a representation result of a program when the reception terminal 104 can receive MPEG4 video stream data 206 and high resolution still image data 1 (206) in addition to the text data 201, low resolution still image data 1 (202), still image data 2 (203) and MPEG4 video stream data 204. In this case, compared to FIG. 4C, the reception terminal 104 increases the resolution of the still image data 1 and also increases the frame rate of video.

In the present invention, as shown in FIG. 4, when there are few media that can be received, the reception terminal 104 carries out layouting suitable for the media and displays a program and when information can be displayed using many media, the reception terminal 104 carries out layouting suitable for the media and displays a program.

Figure 5:
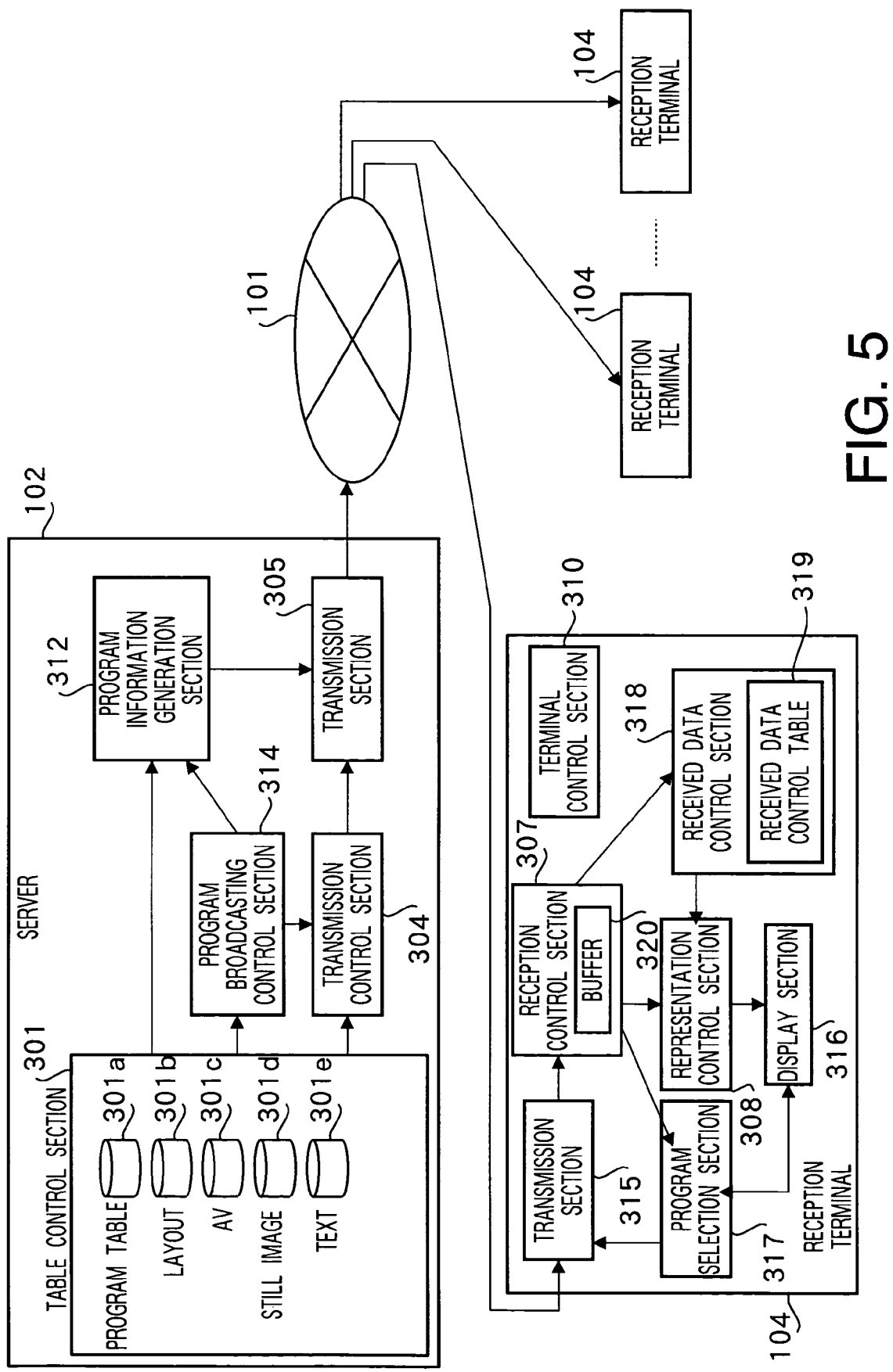
FIG. 5 is a schematic view illustrating an overall image of the media distribution system according to Embodiment 1.

Hereinafter, the configuration of a media distribution system including the reception terminal 104 which displays media in a layout appropriate for media that can be received as described above will be explained using FIG. 5. FIG. 5 is a schematic view showing an overall image of the media distribution system according to Embodiment 1.

The server 102 which is a contents transmission apparatus is provided with a data control section 301, a program broadcasting control section 314, a transmission control section 304, a program information generation section 312 and a transmission section 305.

The data control section 301 is constructed of a program table 301a, a layout information storage section 301b for storing layout information, an AV data storage section 301c for storing the MPEG4 video stream data 204, 206, a still image storage section 301d for storing the still image data 202, 203, 205 and a text storage section 301e for storing the text data 201. The data control section 301 is a recording medium represented by a hard disk drive.

The program table 301a is a table for storing information on a program. Each program is broadcast based on this program table 301a.

Details of the program table 301a will be explained using FIG. 6. FIG. 6 shows the program table 301a stored in the server 102.

The program table 301a stores information on one program and the server 102 stores as many program tables 301a as programs to be broadcast. For simplicity of the drawing, FIG. 5 shows only one program table 301a.

The program table 301a is divided into session information 401 and media information 402.

The session information 401 shows information on the entire program and the media information 402 shows information on respective media which makeup the program.

The session information 401 stores a title 403, a session number 404, a transmission start/end time 405 and a destination address 406.

The title 403 shows the title of this program.

The session number 404 is the number which uniquely identifies this program.

The transmission start/end time 405 describes the start and end times of program transmission.

The destination address 406 shows the destination address of data, indicating the address to which the program data is to be sent.

Furthermore, the media information 402 has information on a file name 407, a transmission name 408, a media type 409, a mandatory flag 410 and a transmission period/iteration count 411.

The file name 407 describes a file name stored in the media (program). The file name 407 includes the names of media data and layout information.

The transmission name 408 shows identifiers given to uniquely identify data. This information is used to specify the respective media using layout information. Furthermore, transmission names of the respective media are input to the program information.

The media type 409 shows the type of the media. This information is input to the program information and sent to the reception apparatus.

The mandatory flag 410 is a flag which indicates, when the corresponding media data cannot be represented, whether the reception terminal 104 is allowed to represent the program using layout information having the media as component media or not. That is, the mandatory flag 410 is a flag indicating whether the media is mandatory or not to represent the layout information.

When the mandatory flag 410 is 1, if the media cannot be represented, it is not allowed to represent the program using the layout information which has the media as a layout component. In other words, the mandatory flag 410 indicates whether the media is a mandatory media which is mandatory for the corresponding layout information or not.

The mandatory flag 410 is described in the program information or layout information and notified to the reception apparatus.

When the media data to be transmitted is a still image or text data, the transmission period/iteration count 411 indicates the iteration period of transmission of the media data and when the media data to be transmitted is stream data, it indicates how many times the stream data is transmitted repeatedly.

In the example of FIG. 6, the stream data is Audio, Video and the iteration count is infinite times (transmission continues until the server 102 issues a stop instruction).

The program table 301a is constructed as shown above.

Here, the explanation of the contents distribution apparatus will be continued using FIG. 5 again.

The program broadcasting control section 314 controls the start/end of broadcasting of each program. The program broadcasting control section 314 stores the program representation start/end times, starts transmission of the program when the transmission start time comes and ends transmission of the program when the end time comes.

More specifically, the program broadcasting control section 314 loads information on the session information 401 from the program table 301a of each program and stores the broadcasting start time/end time 405 of the program recorded therein. When the broadcasting start time of each program comes, the program broadcasting control section 314 instructs the transmission control section 304 and program information generation section 312 to start broadcasting of the program. Furthermore, when the end time comes, the program broadcasting control section 314 instructs the transmission control section 304 and program information generation section 312 on the end of broadcasting of the program.

The transmission control section 304 reads the media information 402 of the instructed program table 301a according to the broadcasting start instruction from the program broadcasting control section 314 and reads the media data and layout information making up the program data based on the file name 407 of the media information 402. The transmission control section 304 hands over the program data read to the transmission section 305. Furthermore, the transmission control section 304 stops broadcasting of the instructed program based on the broadcasting end instruction from the program broadcasting control section 314.

The program information generation section 312 reads the program information of the instructed program from the data control section 301 according to the broadcasting start instruction from the program broadcasting control section 314. Then, if necessary, information on a broadcasting channel of the program data (destination IP address, port number, etc., of each media data) is added to the program information. Then, the program information generation section 312 hands over this program information to the transmission section 305 at constant periods. Furthermore, the program information generation section 312 ends handover of the program information of the instructed program to the transmission section 305 according to the broadcasting end instruction from the program broadcasting control section 314.

When the program information has already been handed over to the reception terminal 104 and the program information need not be transmitted at the time of program broadcasting, the server 102 need not be provided with this program information generation section 312.

The transmission section 305 is an interface capable of transmitting data to an IP network. Furthermore, this transmission section 305 has a function of packetizing the program information and program data received from the program information generation section 312 and transmission control section 304. The transmission section 305 also has a function of transmitting the program information to a predetermined program information channel and transmitting program data to a determined channel based on the program information.

In the above described system, the program information may be generated in real time or before broadcasting. Furthermore, the program information need not always be transmitted together with the program data and may also be transmitted by other means.

For example, it is also possible to prepare another server for transmission of the program information and cause the reception apparatus to acquire the program information using HTTP, etc., from the server.

Next, the reception terminal 104 will be explained.

The reception terminal 104 is provided with a terminal control section 310, a reception control section 307, a program selection section 317, a representation control section 308, a display section 316, a received data control section 318 and a transmission section 315.

The terminal control section 310 controls the entire reception terminal 104. In FIG. 5, for simplicity of the drawing, signal lines from the terminal control section 310 to other process sections are omitted, but there are actually signal lines for all processing sections.

The reception control section 307 stores data received from the transmission section 315 in a buffer 320. Then, the reception control section 307 decides the type of the stored data and when the received data is program information, the data is handed over to the program selection section 317.

When the received data is layout information, the reception control section 307 analyzes the priority of the layout information, media that makes up a layout and whether the display of each media is mandatory or not and the analysis result is written into a received data control table 319.

Furthermore, when the received data is media data, the reception control section 307 decides whether preparations for representation of the media have been completed or not and describes the result in the received data control table 319. Furthermore, the reception control section 307 decides whether the media data can be received consecutively or not and describes the decision result in the received data control table 319. The reception control section 307 has the above described functions.

The program selection section 317 selects a program to be received from the program information received from the reception control section 307 and instructs the transmission section 315 to receive the program. The program selection section 317 may select the program to be received according to an instruction from a viewer or may also be constructed so that the reception terminal 104 automatically selects the program.

As the method of automatically selecting a program, for example, the program selection section 317 selects a program from the received program information at random.

The program selection section 317 causes the display section 316 to show a list of programs such as program titles. Then, the viewer selects an arbitrary program from the program list displayed on the display section 316.

Furthermore, the program selection section 317 finds a channel for receiving program data of a program currently being broadcast from the program information.

Embodiment 1 is constructed so that the program information is transmitted from the server 102 that transmits program data, but the program information can also be acquired by another method. For example, a method of acquiring the program information from an HTTP server using HTTP is available.

The received data control section 318 stores the received data control table 319, detects updates of the received data control table 319, determines layout information to be used based on a table control process which will be described later and notifies the layout information to the representation control section 308.

The representation control section 308 acquires the layout information determined by the received data control section 318 from the reception control section 307 and carries out a representation process on the program data based on the layout information.

The representation control section 308 carries out a decoding process according to various schemes for decoding to represent video or speech. As such a scheme, a standardized scheme such as MPEG4 and MPEG2 may be used or a non-standardized scheme may also be used.

Furthermore, the representation control section 308 determines display positions and display timings of text and animation to combine the decoded information. Synchronization between media may be established using a standardized scheme such as MPEG2, SMIL or using a non-standardized scheme.

The transmission section 315 is an interface which can receive data packets from an IP network. The transmission section 315 has a function of opening a channel for program information reception and receiving program information or opening a channel whose reception start is instructed from the program selection section 317 and receiving the program data.

Furthermore, the transmission section 315 has a function of extracting data from various received data packets and handing it over to the reception control section 307. The transmission section 315 also has a function of closing a channel whose reception end is instructed from the program selection section 317 and stopping reception of the program data.

According to Embodiment 1, the program information and program data are transmitted through the same transmission path, but when the reception terminal 104 is provided with a function of connecting to a plurality of transmission paths, the program information and program data may be received through separate transmission paths.

The display section 316 presents various media such as AV data, text, still image decoded by the representation control section 308 to the viewer at timings determined by the representation control section 308. Presentation to the viewer is performed more specifically using a video display device represented by a CRT and LCD and a speech representation device such as a speaker.

Next, the configuration of the reception control table 319 will be explained using FIG. 7. FIG. 7 illustrates the configuration of the reception control table 319.

The data reception control table 319 is constructed of a layout information table 901 and a media table 902.

The layout information table 901 has fields like priority 903, component media 904 and mandatory flag 905.

The priority field 903 describes priorities of the respective pieces of layout information. The priority is a value indicating which layout should be adopted preferentially. A layout which can express contents in greater detail has higher priority. This priority may be transmitted by the server 102 which is the transmission terminal explicitly or implicitly or determined according to a display policy of the reception terminal 104.

With regard to the priority of the priority (field) 903, there is a method of explicitly notifying it from the server 102 using program information or a packet header and using the notified value or a method of implicitly notifying it according to an arrangement predetermined between the server 102 and reception terminal 104.

As the method of implicitly notifying priority, for example, the order in which layout information is described in the program information can be considered as priority of the layout information.

Layout information ranking high in order of description can be considered as layout information the author of the program wants to express most. Thus, it is also possible to raise the priority of layout information which should be expressed most preferably. As a result, when a plurality of pieces of layout information become ready to be represented, the reception terminal 104 can select the layout information which should be expressed most preferably.

Furthermore, it is also possible to raise the priority of the layout information having long transmission intervals.

The layout information having the longest transmission intervals corresponds to the fewest reception terminals 104 which use the layout information and can include media having a greater amount of information. Thus, it is possible to raise the priority of layout information having a greater amount of information. As a result, when a plurality of pieces of layout information become ready to be represented, the reception terminal 104 can select layout information having a greater amount of information.

Furthermore, instead of the server 102 determining priority, it is also possible to use a method of registering policies such as "layout information included in video has the highest priority" and "most numerous media used have the highest priority" in the reception terminal 104 and representing the media according to the policy.

This makes it possible to raise the priority of layout information including the most numerous media or video media, that is, layout information which should be expressed most preferably. As a result, when a plurality of pieces of layout information become ready to be represented, the reception terminal 104 can select layout information which should be expressed most preferably.

Furthermore, the reception terminal 104 follows a rule that layout information having the highest priority (the smaller the value, the higher the priority in the example in the figure) out of the layout information which is ready to be represented is preferentially represented. Here, that "layout information can be represented" means that part of the media data making up the layout becomes ready to be represented.

A state in which "media data is ready to be represented" means a state in which prebuffering has been completed in the case of stream data and it means that all the media data making up the media have been received in the case of text or still image data.

The component media field 904 shows media making up each layout. The reception terminal 104 acquires the media described in the component media field 904 by analyzing the layout information.

Furthermore, when the program information includes a description of media which make up the layout information, the reception terminal 104 can also acquire the media making up each layout from the program information.

The mandatory flag 905 is a flag indicating whether the media should be ready to be represented or not.

For example, the layout information of priority 1 is made up of text1, image1, image2, audio1 and video1, but when representation is performed using this layout, audio1 and video1 whose mandatory flag 905 is 1 must be ready to be represented. With regard to other media, even when the media cannot be represented, representation can be performed with parts where the media are to be displayed kept blank.

The information on the mandatory flag 905 is stored in the layout information and the reception terminal 104 acquires the information and inputs it in the layout information table 901. Furthermore, when the program information describes the information on the mandatory flag 905, the information can also be acquired and input from the program information.

The media table 902 is made up of a transmission name (media name) 906, a priority 907, a reception completion flag 908 and a consecutive reception possibility flag 909.

The transmission name (field) 906 describes the transmission name of media notified from the server 102 by means of the program information.

The priority (field) 907 describes priority indicating, when there exist some media which are transmitted under the same transmission name, which media is used preferentially.

For example, for image1, data to be transmitted includes data with high resolution and data with low resolution. Therefore, when it is possible to receive data with high resolution, the reception terminal 104 must display the data with high resolution with priority over the data with low resolution. Therefore, image1 with high resolution has higher priority than image1 with low resolution.

This priority may be explicitly sent from the server 102 by being stored in the program information or packet header or may be implicitly notified according to an arrangement predetermined between the server 102 and reception terminal 104.

There may be various cases, for example, a case where the order in which media is described in the program information indicates priority of the media, a case where layout information having longer transmission intervals is given higher priority or a case where media having a greater amount of data is given higher priority.

Furthermore, in the case of scalable media (e.g., when FGS of MPEG4, I frame and P frame of MPEG are transmitted separately), suppose the priority (field) 907 is filled in so that media having only a basic layer has lower priority and media combining, representation, a basic layer and an extended layer has higher priority.

The reception completion flag (field) 908 describes a reception completion flag indicating that the media has become ready to be represented. In the case of stream data, the reception completion flag is set to 1 when prebuffering is completed. Furthermore, in the case of a still image or text data, the reception completion flag is set to 1 when reception of all media data making up the media is completed.

The consecutive reception possibility flag (field) 909 describes a consecutive reception possibility flag indicating whether the media data can be received consecutively or not. That the media data can be received consecutively means that packets can be received consecutively to a certain extent. For example, the consecutive reception possibility flag is set to 1 when a packet loss rate is lower than a threshold and the consecutive reception possibility flag is set to 0 when the packet loss rate exceeds the threshold.

The reception control section 307 of the reception terminal 104 updates the layout information table 901 when program information or layout information is received and updates the media table 902 when program information or media is received. Furthermore, when the layout information to be represented is changed as a result of an update, the reception terminal 104 changes the layout information to be represented and then represents it.

The present invention selects and represents layout information which can be represented by the reception terminal 104 from among a plurality of pieces of layout information, and can thereby realize an appropriate program display according to the data that can be received.

In order for the reception terminal 104 to realize an appropriate selection of layout information, the reception terminal 104 needs to determine 1) priority of layout information, 2) priority of media data, 3) media data making up the layout, 4) media data mandatory to represent the layout and 5) the transmission name of the media in some form.

For this reason, according to Embodiment 1, the server 102 notifies the reception terminal 104 of the above described 1) to 5) by means of the program information.

Hereinafter, the program information according to Embodiment 1 will be explained using FIG. 8. FIG. 8 describes the program information of Embodiment 1 according to SDP (Session Description Protocol, IETF Internet Draft RFC2327).

The program information 1800 shown in FIG. 8 omits the session information of SDP and describes only the portion of the media information.

Furthermore, the program information 1800 indicates that text, still image, still image, video, audio, layout information is transmitted as program data.

More specifically, as shown in 1801, the program information 1800 indicates that text is transmitted through m=field to port number 49234 using an RTP (Realtime Transport Protocol, IETF Internet Draft RFC1889) with payload type 102.

Furthermore, the program information 1800 describes the transmission name of the program data in an a=namemap: field. This field is in an "a=namemap:<PT><transmission name>" format and <PT> indicates the payload type of the RTP. This means that "the transmission name of the media whose payload type of the RTP is <PT> is <transmission name>."

Furthermore, the portion indicated by 1802 of the program information 1800 describes media information of a still image. This example describes that a plurality of still images are transmitted under the same transmission name (they are transmitted with payload types 104, 105 respectively).

In this way, when a plurality of media data are transmitted under the same transmission name, the server 102 must notify which media data should be used preferentially by the reception terminal 104.

In this example, the "a=prioritymap:" field defines it. This field is in an "a=prioritymap:<PT><priority>" format and means that the priority of the media whose "payload type is <PT> is <priority>."

Therefore, the program information 1800 shows that data transmitted with payload type 104 has priority 1, while data transmitted with payload type 105 has priority 2.

Furthermore, the part indicated by 1804 of the program information 1800 describes that video data is transmitted. Video data is set to be transmitted with different payload types assigned to an I frame and P frame of MPEG4. For example, the part "I" of "a=rtpmap:106 MPEG4-ES/90000/I" indicates that the media of the payload type 106 transmits only the I frame.

The part indicated by 1806 of the program information 1800 indicates that layout information is transmitted. With regard to the layout information, as in the case of the part indicated by 1802, an a=priority: field adds priority of the layout information. Furthermore, an a=mediamap: field indicates the media which constitutes the layout information and whether the media is mandatory to represent the layout or not.

The format of this field is in an "a=mediamap:<PT><mandatory component media>; <not mandatory component media>" format. <mandatory component media> and <not mandatory component media> are described by the payload type.

Furthermore, when the media whose plurality of pieces of data are transmitted under the same name is a component media, any one of the pieces of data can be received. In this case, the dependent media is expressed using a slash as "<PT1>/<PT2>" (which means "either <PT1> or <PT2>").

According to a specific example, 1807 of the program information 1800, for example, shows that the "layout information of the payload type 100 has the media (image2) of the payload type 109 described before ";" as a mandatory component media and the payload type 102 (text1) and either 104 or 105 (image1) described after ";" as a not mandatory component media."

Thus, the program information 1800 explicitly shows information on the media making up layout information, and therefore the reception terminal 104 can know the information on the component media without analyzing layout information and can reduce a processing load on the terminal.

The reception terminal 104 may also be designed so as to detect information on the media making up layout information by analyzing the layout information.

Furthermore, Embodiment 1 may also be designed in such a way that the server 102 notifies the reception terminal 104 of 4) media data mandatory to represent the layout by means of layout information.

Next, the layout information for notifying media data mandatory to represent the layout will be explained using FIG. 9. FIG. 9 shows the layout information in Embodiment 1 described in SMIL.

The layout information 1900 shown in FIG. 9 describes that the part indicated by 1901 displays data having a transmission name of "text1" and the part indicated by 1902 displays data having a transmission name of "image1."

Thus, the layout information 1900 describes media data included in this layout.

Furthermore, "display=" of each tag shows whether the media is mandatory to represent this layout information or not. More specifically, "display=" takes either a value "mandatory" or "optional." When "display=" is "mandatory", this indicates that the display is mandatory. On the other hand, when "display=" is "optional", this indicates that the display is not mandatory.

The reception terminal 104 can determine the value of the mandatory flag 905 of the data reception control table 319 using this information ("display=").

Thus, by describing 4) media data mandatory to represent the layout in the layout information, it is possible to notify the reception terminal 104 of the 4) media data mandatory to represent the layout in the layout information.

Furthermore, Embodiment 1 may also be designed in such a way that the server 102 notifies the reception terminal 104 of 1) priority of layout information and 2) priority of media data using the packet header.

Figure 10:
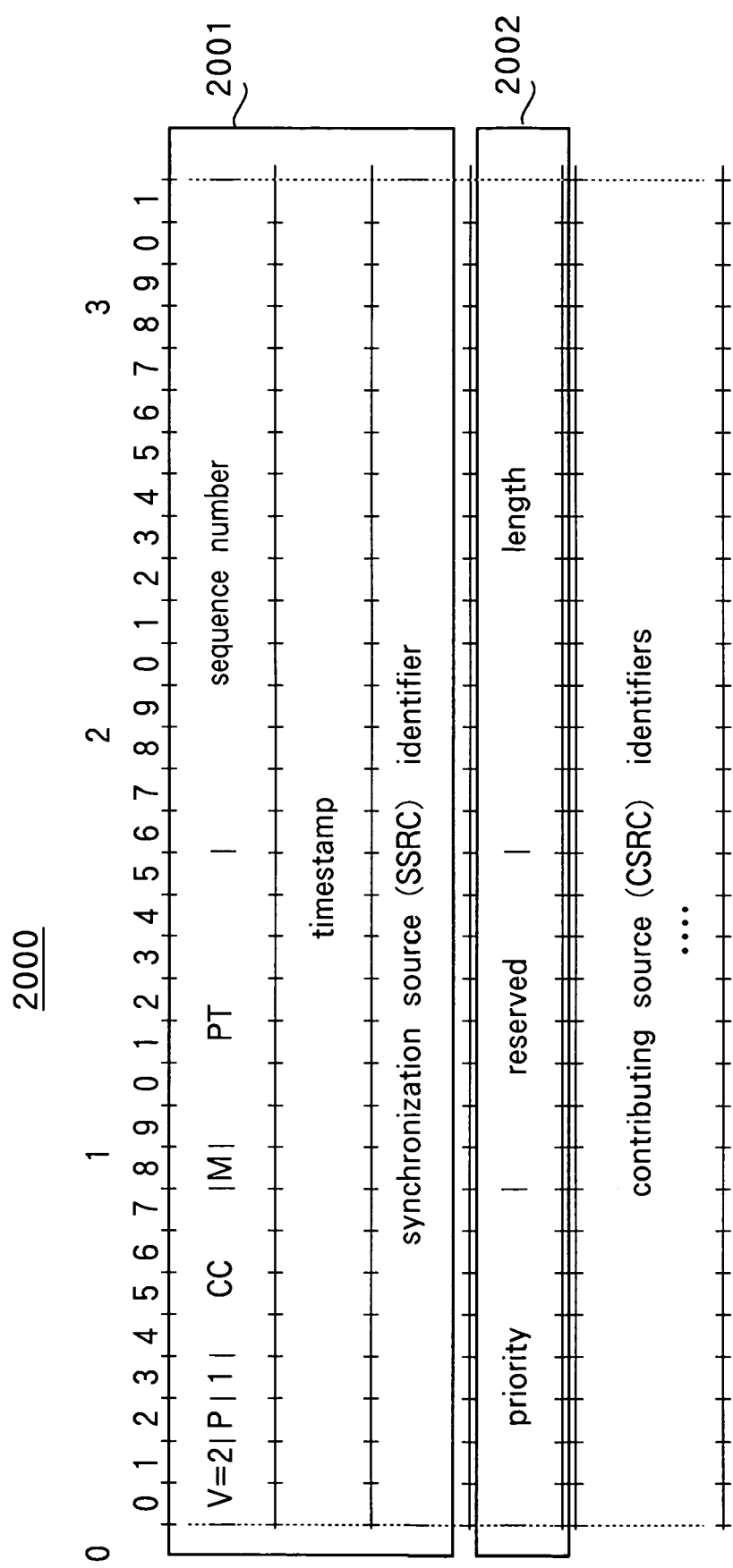
FIG. 10 illustrates a format of a packet header according to Embodiment 1.

The format for notifying 1) priority of layout information and 2) priority of media data using the packet header will be explained using FIG. 10. FIG. 10 shows a format of the packet header according to Embodiment 1.

The packet header 2000 shown in FIG. 10 is an example where a data packet is transmitted according to RTP.

Since the description represented by 2001 of the packet header 2000 is within a standard range of RTP, explanations thereof will be omitted.

Furthermore the description represented by 2002 of the packet header 2000 is a format in extending RTP.

More specifically, "length" is a field in which the length of an extended field (part represented by 2002) is input in byte units. "priority" is a field in which the priority of the media is input and priority is assigned to layout information and media using this field. Furthermore, "reserved" is a reserved part and not used.

Since the packet header 2000 is described in this way, the reception terminal 104 can recognize 1) priority of layout information and 2) priority of media data by analyzing the packet header 2000.

Furthermore, in addition to the above described method of describing a plurality of pieces of layout information in the program information and describing the corresponding priorities, there is also a method of notifying priority of use of layout information by transmitting a plurality of pieces of program information itself and assigning priority to the program information itself as the method of notifying priority of use of the layout information.

Hereinafter, the program information to transmit a plurality of pieces of program information itself and assign priority to the program information itself will be explained using FIG. 11. FIG. 11 illustrates an example of transmitting the program information of Embodiment 1 according to SDP.

Unlike the aforementioned example, this example assumes that a plurality of pieces of program information are transmitted for one program and program information 2101, 2102 are transmitted individually.

Furthermore, unlike the example in FIG. 8, each piece of program information describes only one piece of layout information. More specifically, parts shown in 2105 and 2106 correspond to fields in which information on the layout information is described.

Thus, the program information is in a one-to-one correspondence with the layout information, which allows the priority assigned to the program information to show the priority of use of the layout information.

As shown by 2103 and 2104 in the fields in which session information is input, the priority of the program information is expressed by inserting an "a=priority:" field.

This field is in an "a=priority:<priority>" format meaning that the "priority of this program information is <priority>."

Using such data 1800, 1900, 2000, 2101 and 2102, the reception terminal 104 can determine 1) priority of layout information, 2) priority of media data, 3) media data making up the layout, 4) media data mandatory to represent the layout and 5) the transmission name of the media.

Figure 12:
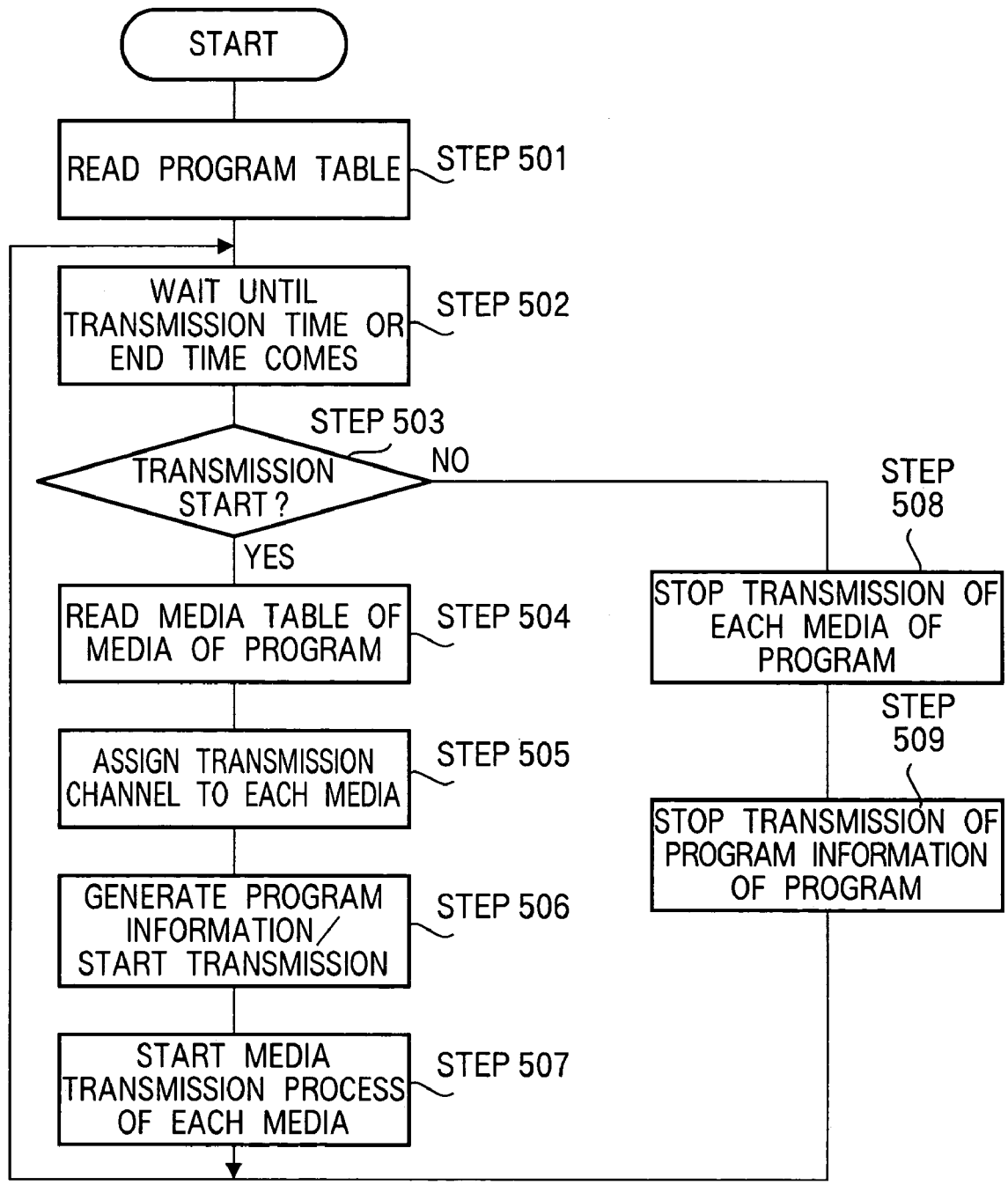
FIG. 12 is a flow chart illustrating the operation of the server according to Embodiment 1.

Next, the operation of the server 102 will be explained using FIG. 12. FIG. 12 is a flow chart showing the operation of the server 102 of Embodiment 1.

When started, the server 102 reads and stores the transmission start/end time 405 of the program table 301*a* according to the program to be processed at the program broadcasting control section 314 (step 501).

Then, the program broadcasting control section 314 waits until the transmission start time or end time come (step 502). When the transmission start time of a certain program comes (step 503), the program broadcasting control section 314 extracts the media information 402 of the program table 301*a* of the program and stores information on the data to be transmitted (step 504).

Next, the program information generation section 312 of the server 102 references the file name 407 of the media information 402 stored by the program broadcasting control section 314, assigns transmission channels to the media data and layout information included in the media information 402 (step 505), thereby generates program information and transmits the program information to the reception terminal 104 through the transmission section 305 (step 506).

Next, the program broadcasting control section 314 instructs the transmission control section 304 to start a data transmission process (media transmission process) of each piece of media data and each piece of layout information included in the program information transmitted in step 506 and the transmission control section 304 starts a media transmission process (step 507). Details of the media transmission process will be described later.

Furthermore, when the transmission end time comes (step 503), the program broadcasting control section 314 instructs the transmission control section 304 to end the media transmission process of the program. Then, the transmission control section 304 ends (stops) transmission of each piece of media data and each piece of layout information included in the program (step 508). Next, the program broadcasting control section 314 stops the transmission process of the program information of the program (step 509).

Figure 13:
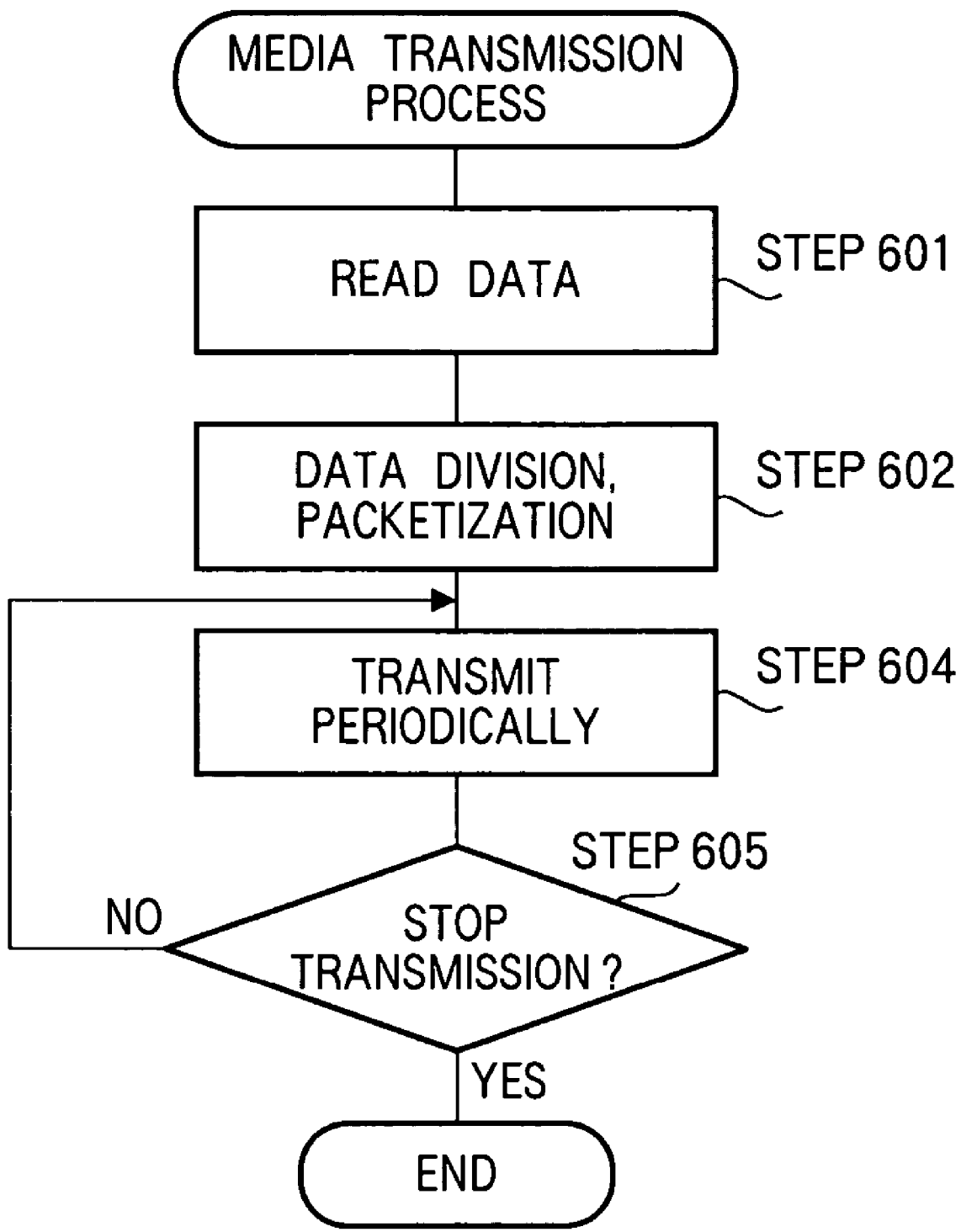
FIG. 13 is a flow chart of a media transmission process by the server according to Embodiment 1.

Next, the media transmission process by the server 102 will be explained using FIG. 13. FIG. 13 is a flowchart of the media transmission process by the server 102 according to Embodiment 1.

The media transmission process is carried out for each piece of media data.

First, the transmission control section 304 references the media information 402 in the program table 301*a* of the data control section 301 and extracts the file name 407 included in the program. Then, the transmission control section 304 reads the media data and layout information corresponding to the extracted file name 407 from the layout information storage section 301*b*, AV information storage section 301*c*, still image storage section 301*d* and text storage section 301*e* (step 601).

Next, the transmission control section 304 divides the read media data and layout information and sends it to the transmission section 305.

Next, the transmission section 305 assigns a packet header to each piece of the transmitted data and packetizes it (step 602).

Then, the transmission section 305 repeatedly transmits packets periodically until the transmission control section 304 gives a transmission stop instruction to the reception terminal 104 of the packet generated (step 604), and when the transmission control section 304 gives a transmission stop instruction (step 605), the transmission section 305 ends the data transmission process.

In this way, the server 102 transmits the media data and layout information to the reception terminal 104.

Figure 14:
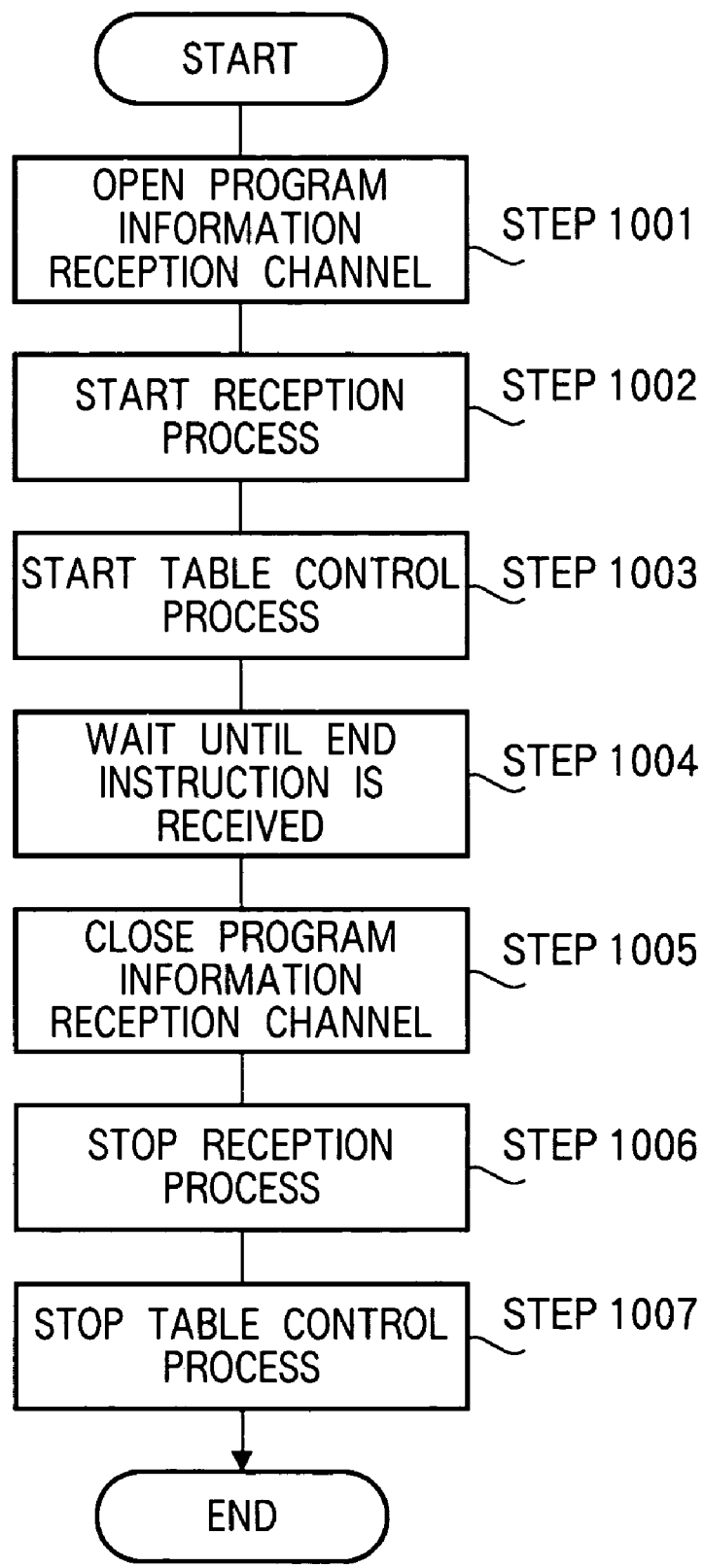
FIG. 14 is a flow chart illustrating the operation of the reception terminal according to Embodiment 1.

Next, the operation of the reception terminal 104 will be explained using FIG. 14. FIG. 14 illustrates the operation of the reception terminal 104 according to Embodiment 1.

First, when the reception terminal 104 is started, the transmission section 315 opens a predetermined program information reception channel (step 1001).

Next, the reception terminal 104 starts a reception process by the reception control section 307 which will be described later (step 1002) and starts a table control process by the received data control section 318 which will be described later (step 1003).

Then, each process section of the reception terminal 104 waits until an end instruction is received from the terminal control section 310 (step 1004).

When the end instruction is received, the transmission section 315 closes the program information reception channel (step 1005), the reception control section 307 stops the reception process (step 1006) and the received data control section 318 stops the table control process (step 1007).

The reception terminal 104 starts the operation and stops the operation in this way.

Figure 15:
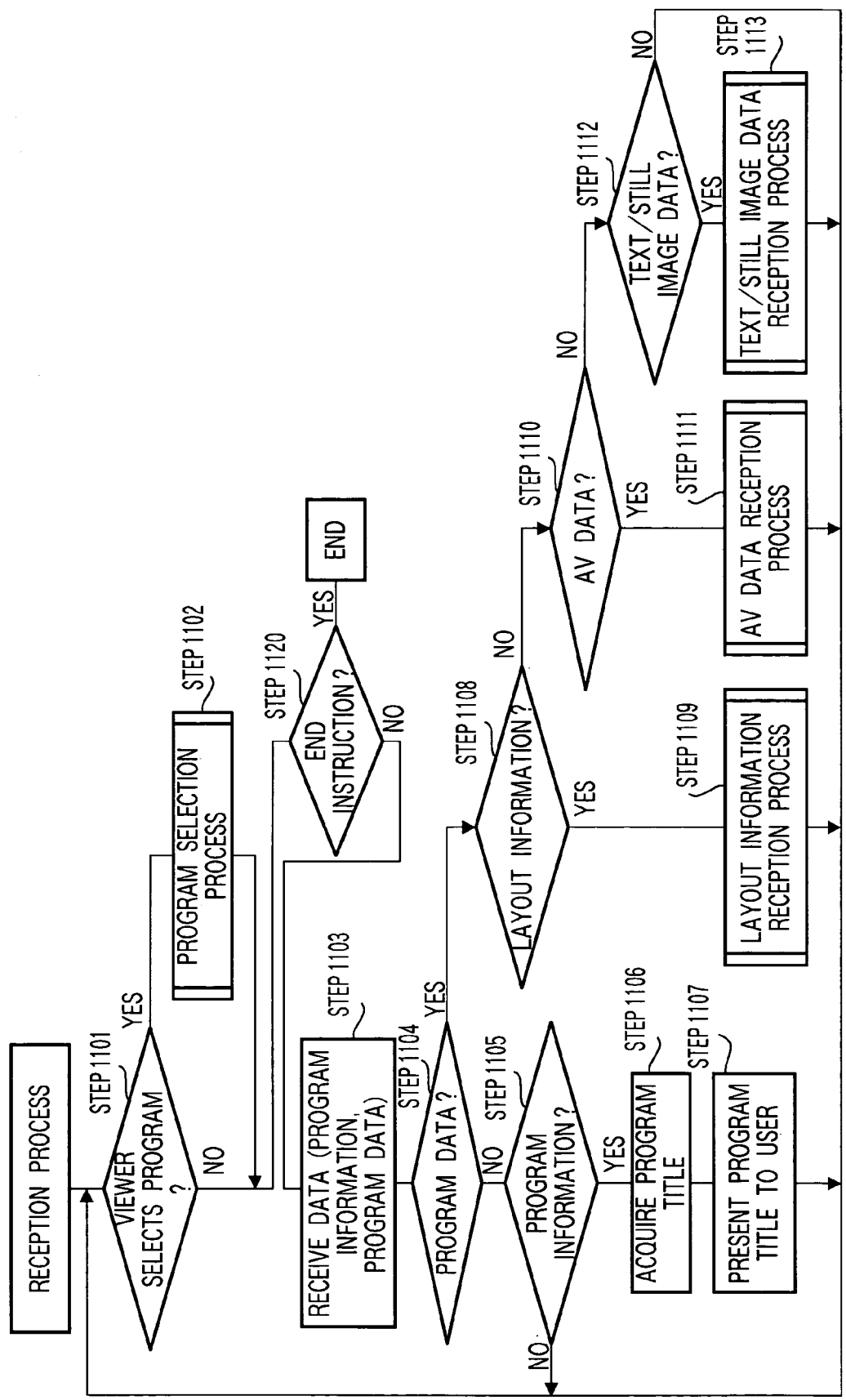
FIG. 15 is a flow chart of a reception process by the reception terminal according to Embodiment 1.

Next, a reception process by the reception terminal 104 will be explained using FIG. 15. FIG. 15 is a flowchart of the reception process by the reception terminal 104.

The reception process is an operation when program information or program data is received and a process when the user selects a program.

First, the reception control section 307 of the reception terminal 104 decides whether the user has selected a program or not (step 1101) and carries out, when the user has selected the program, a program selection process which will be described later (step 1102).

When the user has not selected any program, the reception control section 307 decides whether an end instruction has been received from the terminal control section 310 or not (step 1120) and ends the reception process when the end instruction has been received.

When no end instruction has been received, the transmission section 315 then receives data such as program information and program data and sends the data to the reception control section 307 (step 1103).

Then, the reception control section 307 decides whether the received data is program data or not (step 1104).

When the received data is not the program data, the reception control section 307 decides whether the received data is program information or not (step 1105).

When the received data is the program information, the reception control section 307 instructs the program selection section 317 to acquire the title of the program. In response to this, the program selection section 317 acquires the title of the program (step 1106). Then, the program selection section 317 presents the program title to the user (step 1107) and returns to step 1101.

Furthermore, when the received data is the program data in step 1104, the reception control section 307 decides whether it is layout information or not (step 1108) and when it is layout information, the reception control section 307 carries out a layout information reception process which will be described later (step 1109) and returns to step 1101.

Furthermore, when the received data is not the layout information in step 1108, the reception control section 307 decides whether it is AV data or not (step 1110). When the received data is AV data, the reception control section 307 carries out an AV data reception process which will be described later (step 1111) and returns to step 1101.

Furthermore, when the received data is not the AV data in step 1111, the reception control section 307 decides whether the received data is text/still image data or not (step 1112) and when the received data is text or still image data, the reception control section 307 carries out a text/still image data reception process (step 1113) and returns to step 1101.

The reception terminal 104 carries out the reception process in this way.

Figure 16:
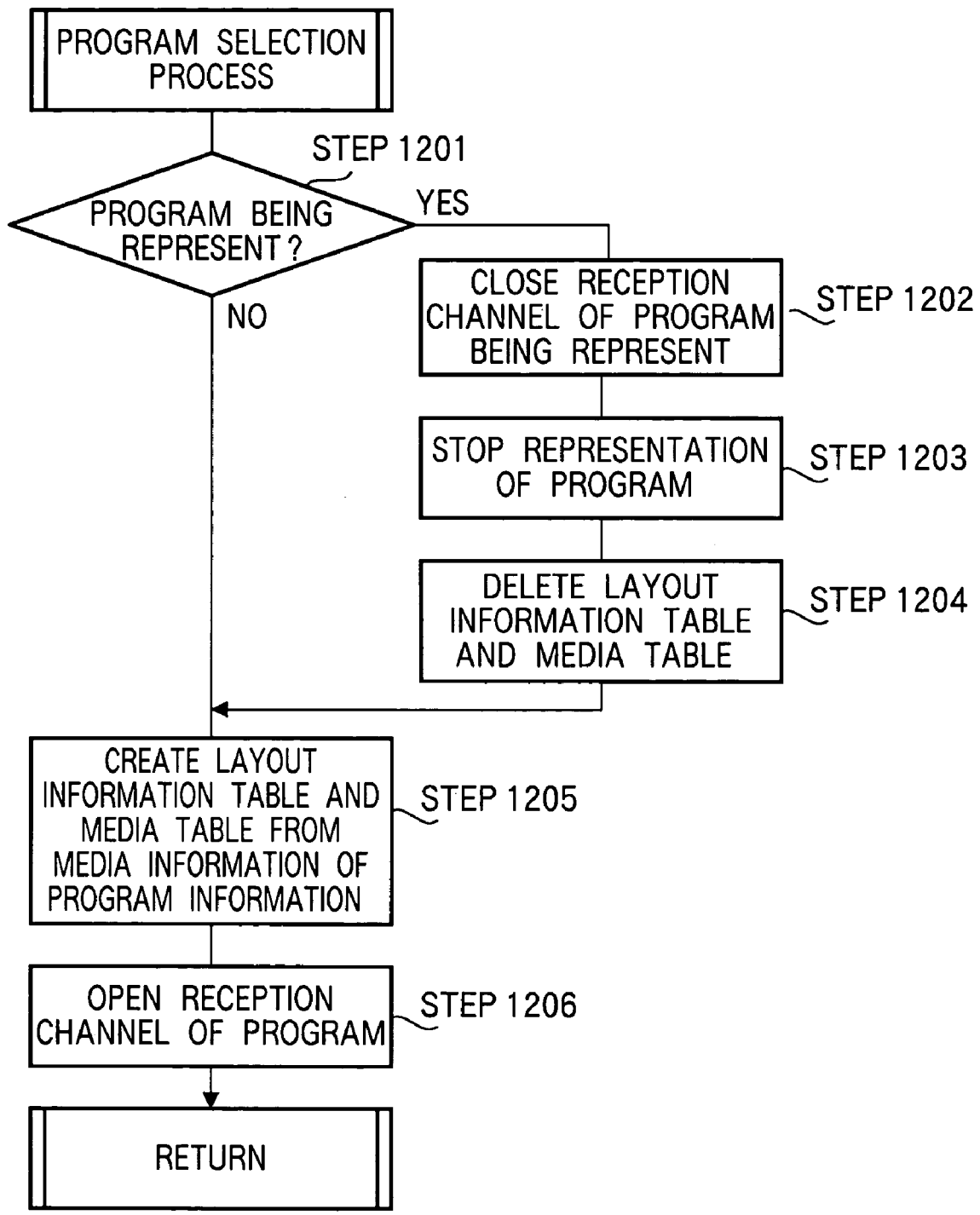
FIG. 16 is a flow chart illustrating a program selection process by the reception terminal according to Embodiment 1.

Next, a program selection process by the reception terminal 104 will be explained using FIG. 16. FIG. 16 illustrates the program selection process by the reception terminal 104. The program selection process corresponds to the process in step 1102 shown in FIG. 15.

In the program selection process, the reception control section 307 decides whether the reception terminal 104 is currently representing another program or not first (step 1201).

When no other program is being represented, the reception control section 307 creates the layout information table 901 and media table 902 from the media information of the program information to be received this time (step 1205).

Next, the reception control section 307 instructs the transmission section 315 to open a reception channel of the program, the transmission section 315 opens the reception channel of the program (step 1206) and ends the process.

On the other hand, when the program is being represented in ST1201, the reception control section 307 closes the reception channel of the program being represented to process the program received this time (step 1202), stops representation of the program currently being represented (step 1203) and deletes the information stored in the received data control table 319 (step 1204). Then, the reception control section 307 moves to the process in step 1205.

The reception terminal 104 carries out the program selection process in this way.

Figure 17:
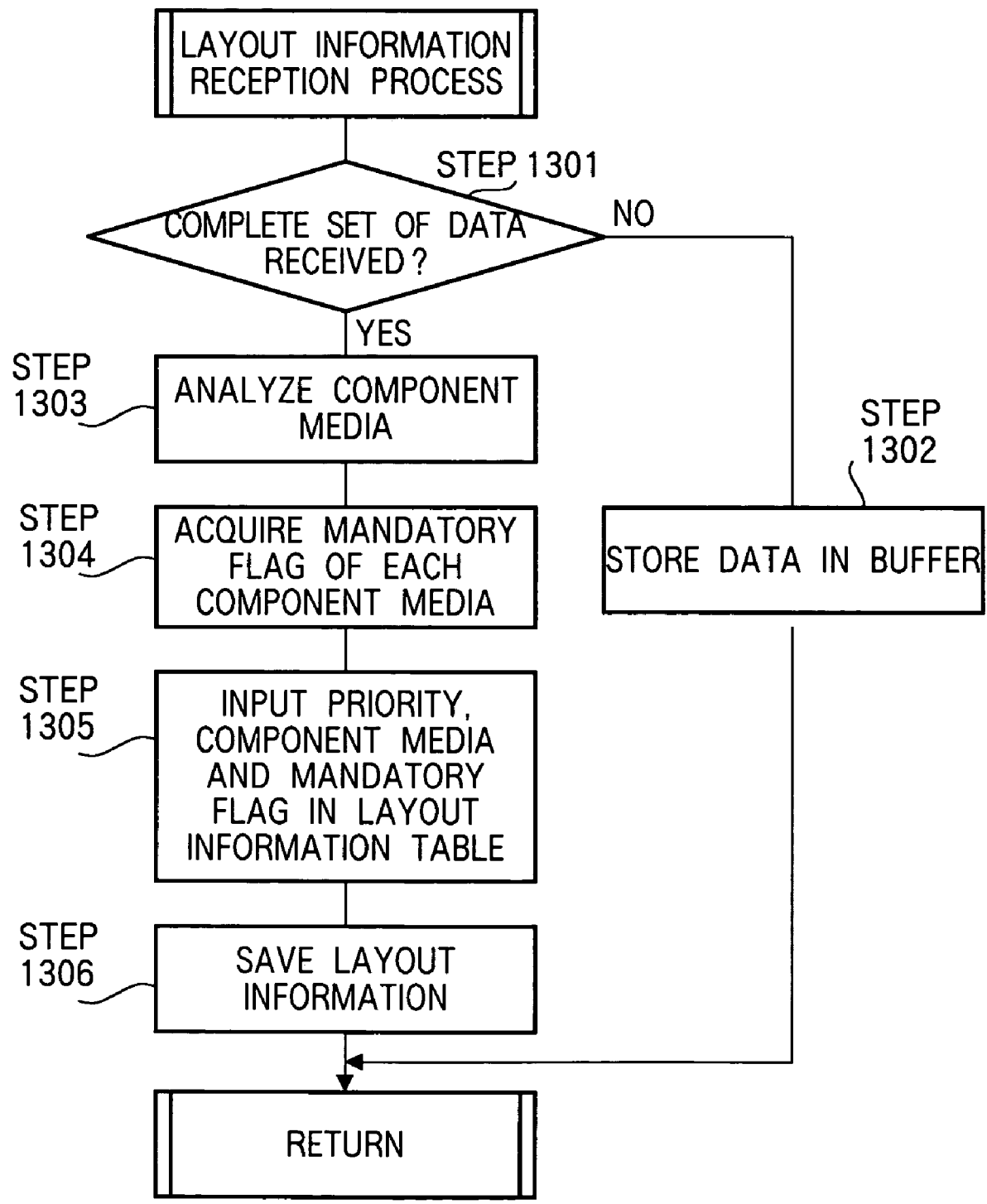
FIG. 17 is a flow chart illustrating a layout information reception process by the reception terminal according to Embodiment 1.

Next, a layout information reception process by the reception terminal 104 will be explained using FIG. 17. FIG. 17 illustrates the layout information reception process by the reception terminal 104. This process corresponds to the process in step 1109 shown in FIG. 15.

First, data is transmitted from the server 102 divided/packetized and the reception control section 307 checks if a complete set of divided data has been received or not (step 1301).

When the complete set of divided data has not been received, the reception control section 307 stores the data in the buffer 320 and returns (step 1302).

On the other hand, when the complete set of divided data has been received, the reception control section 307 reads the data stored in the buffer 320, makes up layout information and analyzes the media that make up the layout information (step 1303).

Next, the reception control section 307 acquires a mandatory flag of each component media (step 1304). Next, the reception control section 307 inputs priority 903, component media 904 and mandatory flag 905 in the layout information table 901 (step 1305), saves this layout information table 901 and ends the process (step 1306).

The reception control section 307 creates the layout information table 901 in this way.

Figure 18:
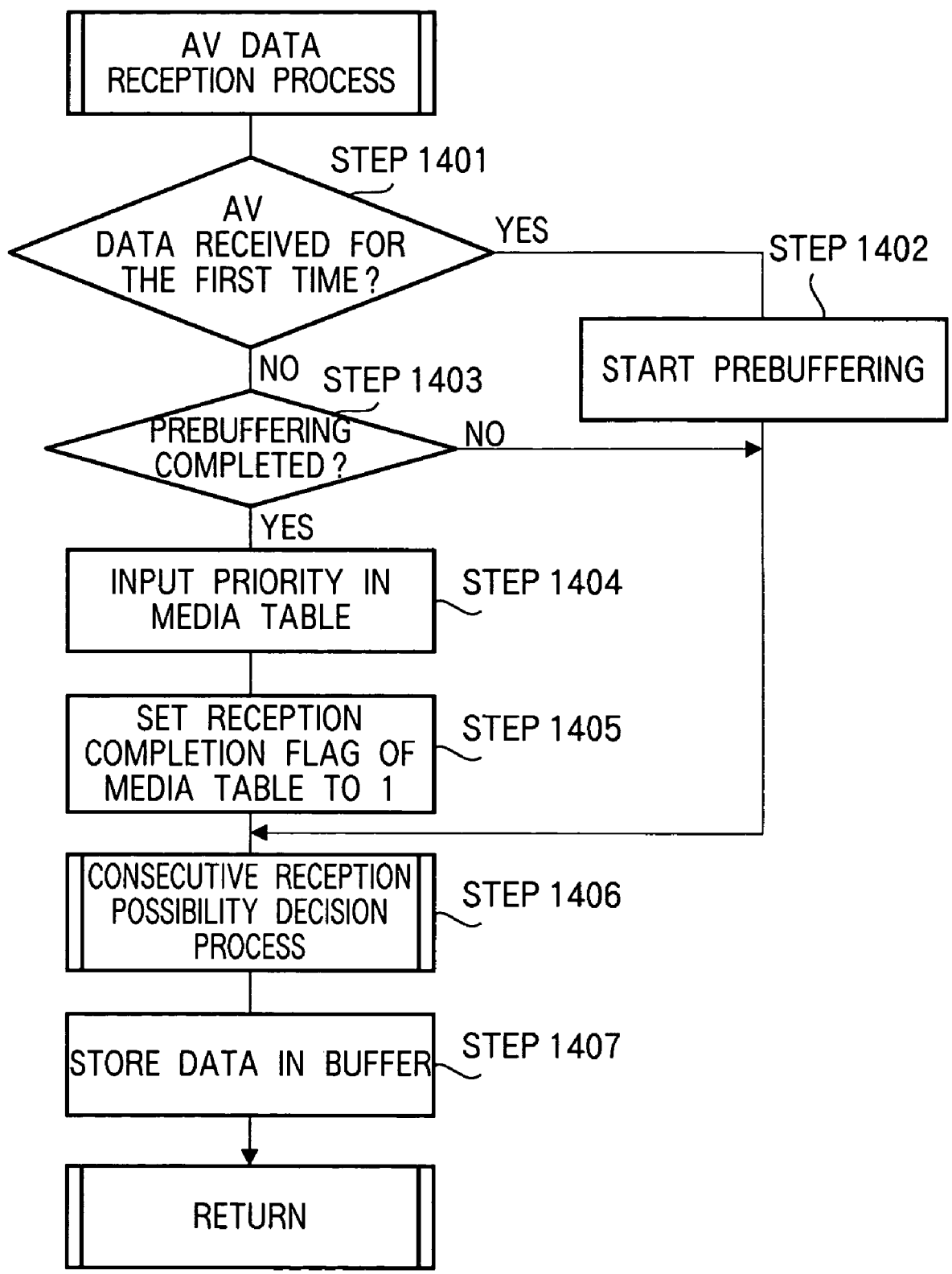
FIG. 18 is a flow chart illustrating an AV data reception process by the reception terminal according to Embodiment 1.

Next, an AV data reception process by the reception terminal 104 will be explained using FIG. 18. FIG. 18 is a flow chart showing the AV data reception process by the reception terminal 104 in Embodiment 1. The AV data reception process corresponds to the process in step 1111 shown in FIG. 15.

First, the reception control section 307 decides whether the received data is the AV data received for the first time after the program is received or not (step 1401).

When it is the AV data received for the first time, the reception control section 307 starts a prebuffering process (step 1402).

The prebuffering process is a process of saving data after receiving the AV data without representing it for a certain time. Then, the reception control section 307 moves to a process in step 1406.

On the other hand, when the received data is not the AV data received for the first time in step 1401, the reception control section 307 decides whether the prebuffering has been completed or not (step 1403) and moves to the process in step 1406 if the prebuffering has not been completed.

Furthermore, if the prebuffering has been completed in step 1403, the reception control section 307 inputs priority of the media in the media table 902 (when the information of priority is explicitly notified, it is notified by means of the program information or packet header, and therefore the information is input) (step 1404) and sets the corresponding reception completion flag of the media table 902 to 1 (step 1405).

Next, the reception control section 307 carries out a consecutive reception enable decision process which will be described later (step 1406), stores the received data in the buffer 320 and ends the AV data reception process (step 1407).

The reception control section 307 carries out the AV data reception process in this way.

Figure 19:
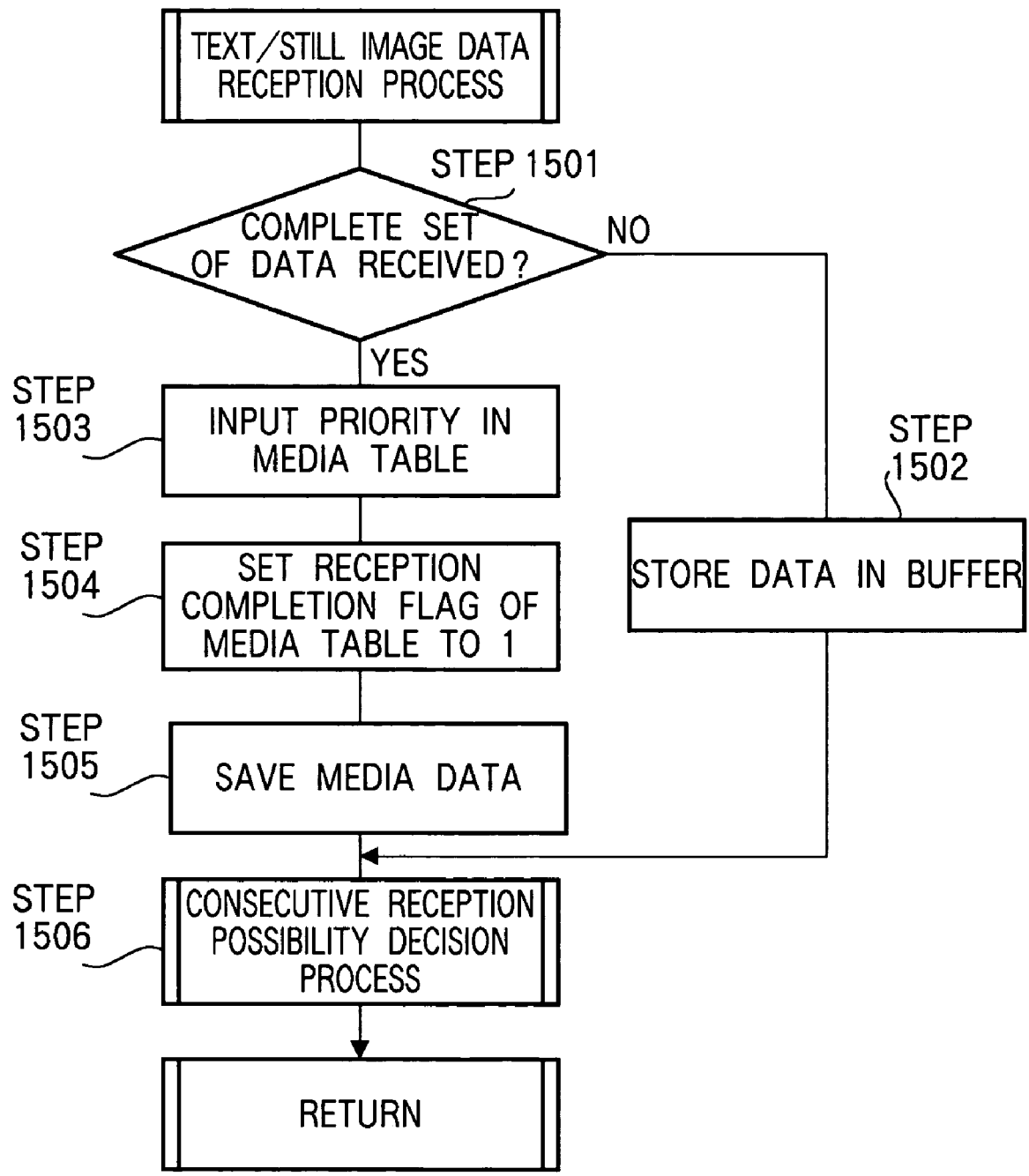
FIG. 19 is a flow chart illustrating a text/still image data reception process by the reception terminal according to Embodiment 1.

Next, a text/still image data reception process by the reception terminal 104 will be explained using FIG. 19. FIG. 19 is a flow chart showing the text/still image data reception process. The text/still image data reception process corresponds to the process in step 1113 shown in FIG. 15.

First, since data which is transmitted from the server 102 is transmitted divided/packetized, the reception control section 307 checks whether a complete set of the divided data has been received or not (step 1501).

When the complete set of the divided data has not been received, the reception control section 307 saves the data in the buffer 320 and moves to a process in step 1506.

When the complete set of the divided data has been received, the reception control section 307 reads the media data stored in the buffer 320 and makes up media. Then, the reception control section 307 inputs priority in the corresponding field of the media table 902 (when explicitly notified, the priority information is notified by the program information or packet header, and therefore the information is input) (step 1503). Next, the reception control section 307 sets the corresponding reception completion flag of the media table 902 to 1 (step 1504).

Then, the reception control section 307 saves text/still image data which is the media data in the buffer 320 (step 1505).

Then, the reception control section 307 carries out a consecutive reception possibility decision process which will be described later (step 1506) and ends the process.

The reception control section 307 carries out the text/still image data reception process in this way.

Figure 20:
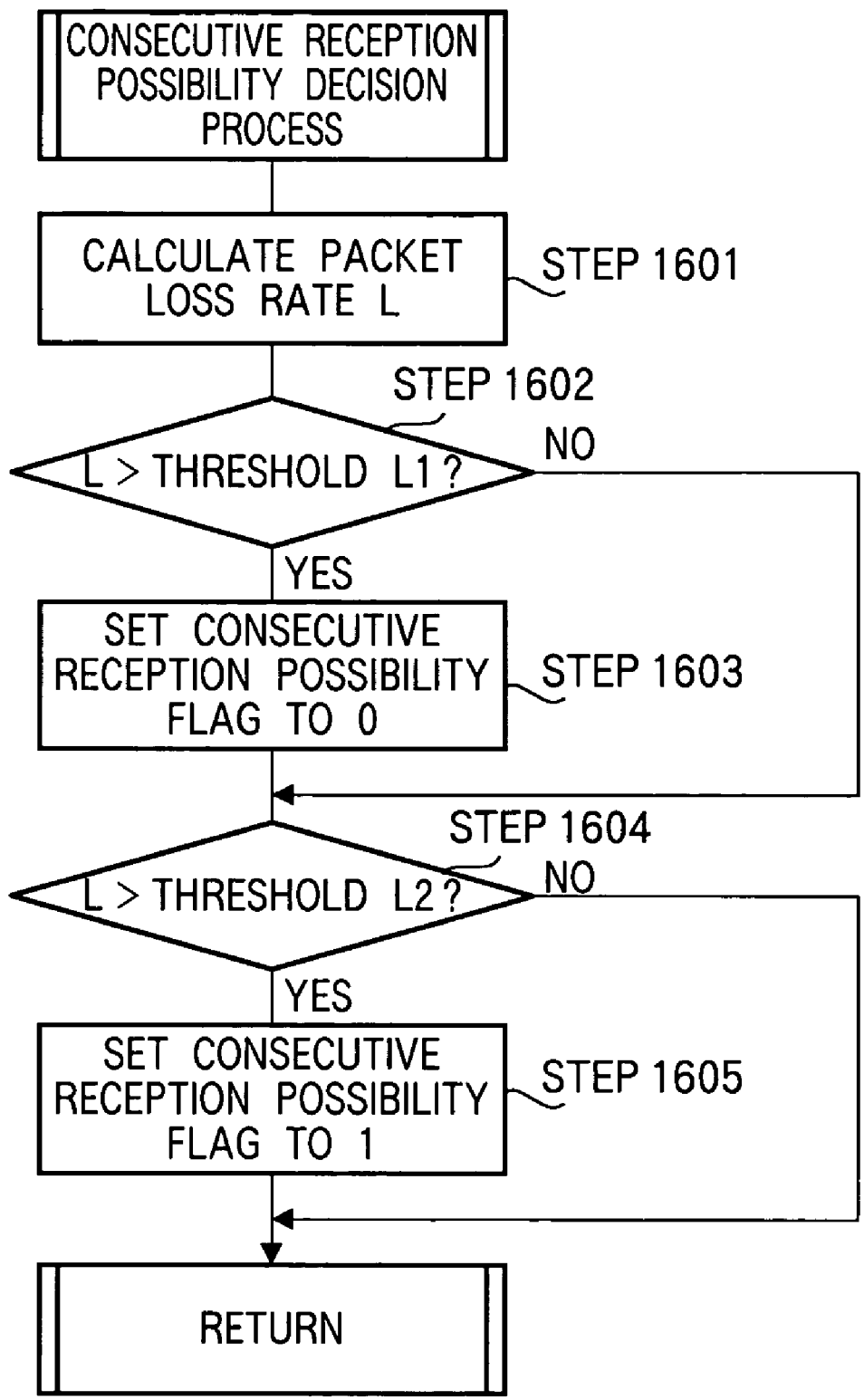
FIG. 20 is a flow chart illustrating a consecutive reception possibility decision process by the reception terminal according to Embodiment 1.

Next, the consecutive reception possibility decision process by the reception terminal 104 will be explained using FIG. 20. FIG. 20 is a flow chart showing the consecutive reception possibility decision process by the reception terminal 104 in Embodiment 1. This process corresponds to the process in step 1406 in FIG. 18 and step 1506 in FIG. 19.

First, the reception control section 307 calculates a packet loss rate L of the media data (step 1601).

The packet loss rate can be calculated from the history of packets received in the past. Sequence numbers are assigned to packets and a packet loss can be detected from missing of its sequence number. The packet loss rate can be calculated, for example, from an expression of L=(number of packets which have been lost in last five seconds)/((sequence number of latest packet received)−(sequence number of packet received last five seconds ago).

Next, the reception control section 307 decides whether the packet loss rate L is greater than a threshold L1 (fixed value to be preset) or not (step 1602) and when the packet loss rate L is greater than the threshold, the reception control section 307 decides that it is difficult to receive packets consecutively and sets 0 in the consecutive reception flag 909 of the media (step 1603).

Next, the reception control section 307 decides whether the packet loss rate L is smaller than a threshold L2 (preset fixed value, a value smaller than L1) (step 1604), and when the packet loss rate L is smaller than the threshold, the reception control section 307 decides that it is possible to receive packets consecutively and sets the consecutive reception possibility flag 909 of the media to 1 and ends the process (step 1605).

Thus, the reception terminal 104 sets the consecutive reception flag 909 and decides that the media can be represented when the consecutive reception flag 909 is 1 and can thereby prevent the reception terminal 104 positioned on the boundary of zones from becoming unstable representation.

Figure 21:
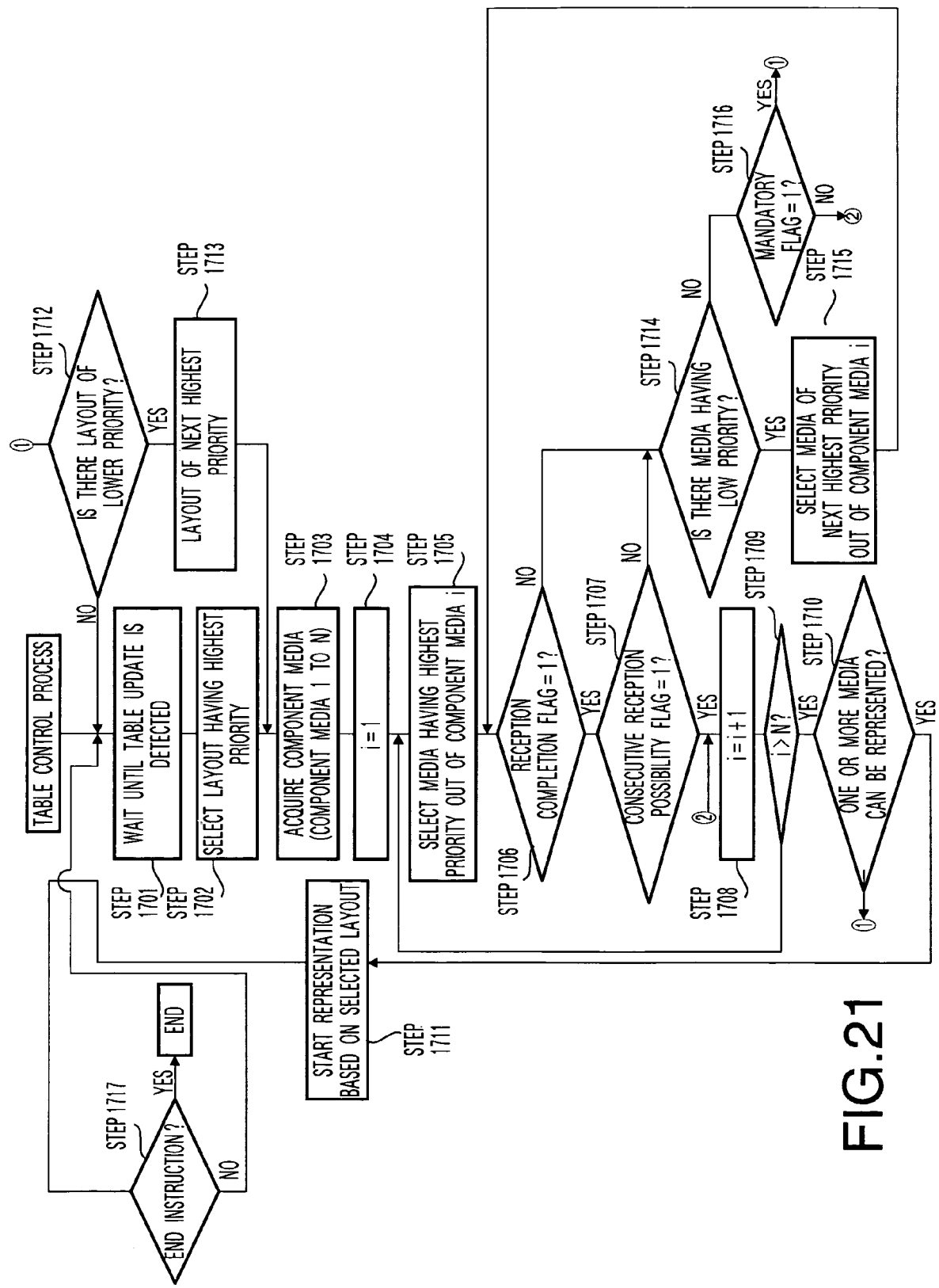
FIG. 21 is a flow chart illustrating the operation of a table control process by the reception terminal according to Embodiment 1.

Next, a table control process by the reception terminal 104 will be explained using FIG. 21. FIG. 21 is a flow chart which explains the operation of the table control process by the reception terminal 104 in Embodiment 1.

During the table control process, the received data control section 318 waits until the contents of the received data control table 319 are updated (step 1701).

Then, when the contents of the received data control table 319 are updated, the received data control section 318 references the layout information table 901 and selects the layout information having the highest priority 903, that is, the layout information that can display most detailed data as the processing target (step 1702).

Next, the received data control section 318 acquires the component media of the layout information to be processed from the layout information table 901 (step 1703) and carries out the following representation possibility decision process for each component media.

The received data control section 318 expresses individual component media of the layout information to be processed as component media 1 to N, where N is the number of component media.

The received data control section 318 references the information on a component media i from the media table 90 (step 1704) and when the component media i has a plurality of priorities, the received data control section 318 selects the component media i having the highest priority and carries out the following process (step 1705).

First, the received data control section 318 checks whether the reception completion flag and consecutive reception possibility flag of the media selected in step 1705 is 1 or not (step 1706, step 1707).

Then, when both the reception completion flag and consecutive reception possibility flag are 1, the received data control section 318 decides that the media can be represented and returns to step 1705 and continues the process about the next media (component media i+1) (step 1708).

Thus, when the consecutive reception possibility flag based on the loss rate in the transmission path of the media is 1, that is, only when the media can be represented consecutively, it is possible to represent the media and prevent deteriorated information with many packet losses from being displayed.

Then, the received data control section 318 carries out a representation possibility decision process on all N media (step 1709).

Next, the received data control section 318 decides whether one or more media can be represented or not (step 1710) and when one or more media can be represented, the received data control section 318 starts representation based on the selected layout information (step 1711).

Then, when no end instruction is received from the terminal control section 310 (step 1717), the received data control section 318 returns to the process in step 1701 and ends the process when an end instruction is received.

On the other hand, if no media that can be represented exists as a result of carrying out the representation decision process in step 1710, the received data control section 318 decides that this layout information cannot be represented and moves to step 1712.

In step 1712, the received data control section 318 decides whether there is layout information having lower priority than layout information currently being processed, that is, whether there is any other layout information or not.

When there is layout information having lower priority, the received data control section 318 selects layout information next in priority to the layout information currently being processed (step 1713) and moves to step 1703.

On the other hand, when there is no layout information having lower priority in step 1712, this means that there is no layout that can be represented, and therefore the received data control section 318 moves to step 1701 and waits until the received data control table 319 is updated.

Furthermore, when either the reception completion flag or consecutive reception possibility flag is 0 in step 1706 or step 1707, it is possible to decide in step 1705 that the selected media cannot be represented. Therefore, the received data control section 318 decides whether there is component media i having lower priority or not to detect media that can be represented (step 1714).

When there is component media i having lower priority, the received data control section 318 selects the next layout information in ascending order of priority (step 1715) and moves to the process in step 1706.

On the other hand, when there is no media having lower priority in step 1713, the received data control section 318 checks the mandatory flag 905 of the media (step 1716) and if the mandatory flag is 0, the media data need not always be represented, and therefore the received data control section 318 decides whether the next media can be represented or not.

On the other hand, when the mandatory flag is 1, the received data control section 318 cannot represent the media whose representation is mandatory, and therefore the received data control section 318 decides that this layout cannot be represented and moves to step 1712.

In this way, the reception terminal 104 references the mandatory flag, and can thereby decide whether or not represent the layout information of some media data which are not ready to be represented.

The reception terminal 104 carries out the table control process in this way.

As described above, according to Embodiment 1, the reception terminal 104 selects layout information appropriate for the media data that can be received and can display the received media data using the selected layout information. For example, when the reception terminal 104 has received only text or still image, it carries out layouting appropriate for only text or still image, displays the text or still image and when it can receive video, speech, still image or text, the reception terminal 104 can carry out layouting appropriate for these media and display the media. That is, when the reception terminal 104 displays transmitted contents made up of various media such as video, speech, still image or text, the reception terminal 104 can display contents in a mode appropriate for the media data that can be received.

Furthermore, according to Embodiment 1, when a plurality of pieces of layout information become ready to be represented, it is possible to decide which piece of layout information should be selected according to priority.

It is also possible to adopt a mode in which the operations of the server 102 and reception terminal 104 in Embodiment 1 may be converted to a program, stored in a storage medium and executed by a general-purpose computer.

Embodiment 2

Embodiment 2 of the present invention will present an embodiment in a case where contents of a communication type instead of a broadcasting type are distributed.

The communication type contents differ from the broadcasting contents in that the reception terminal sends a distribution request of contents (the same as the program data in the case of broadcasting) and differ in the method of acquiring detailed information of contents (program information in the case of broadcasting). The method of distributing contents is the same as that in the case of broadcasting.

In Embodiment 2, the mode of use of a target communication network is the same as that shown in FIG. 3.

Figure 22:
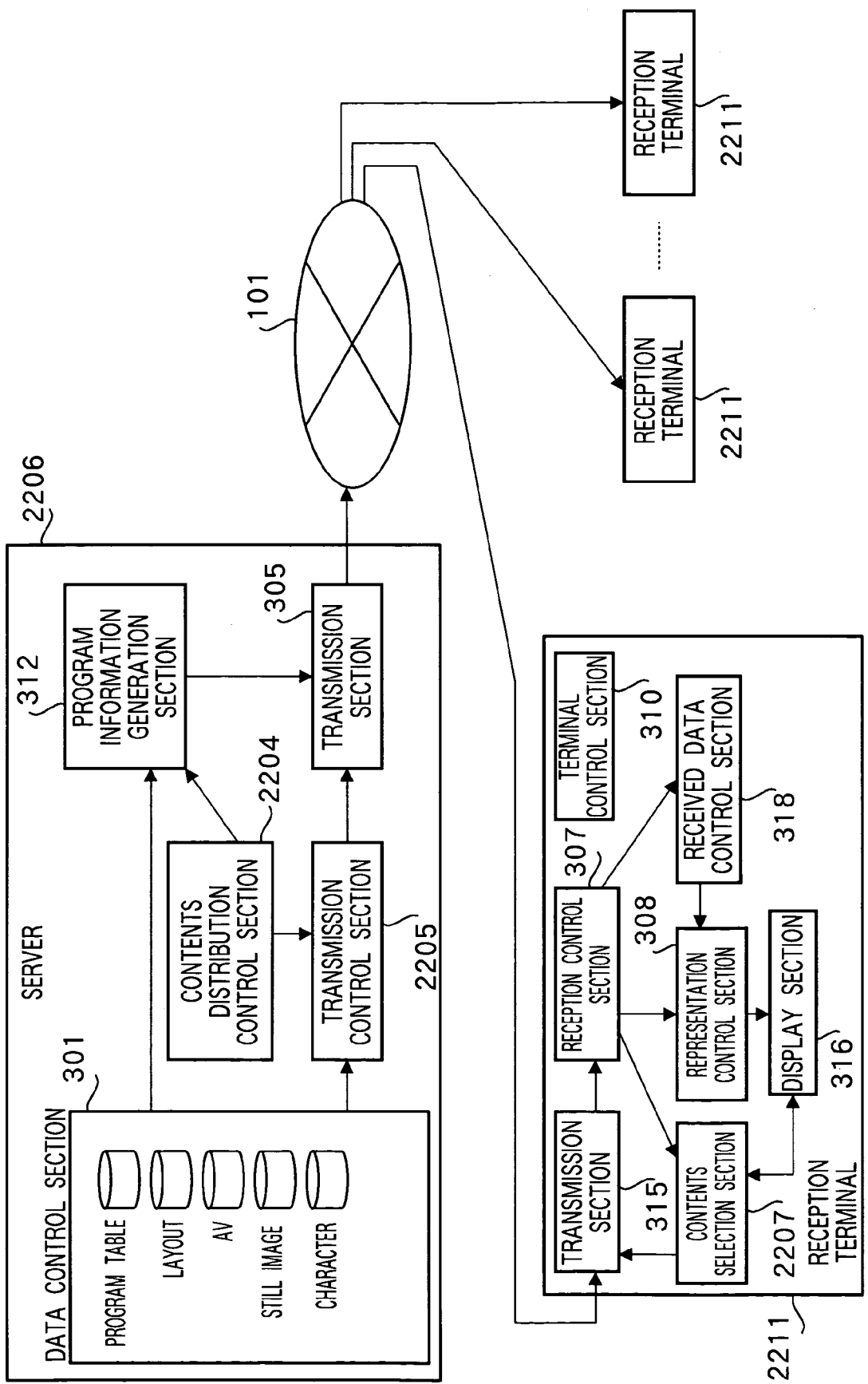
FIG. 22 is a block diagram illustrating an overall image of a contents system according to Embodiment 2 of the present invention.

Embodiment 2 will be explained using the drawings in detail below. First, a media distribution system according to Embodiment 2 will be explained using FIG. 22. FIG. 22 is a block diagram showing an overall image of the contents system according to Embodiment 2. FIG. 22 differs from FIG. 5 in that a server 2206 is provided with a contents distribution control section 2204 instead of the program broadcasting control section 314 and a reception terminal 2211 is provided with a contents selection section 2207 instead of the program selection section 317. Other parts are the same, and therefore they are assigned the same reference numerals and detailed explanations thereof will be omitted.

The contents distribution control section 2204 is a section that receives a contents distribution request from a reception terminal 2211 and controls distribution of contents. Contents distribution is controlled using a protocol such as HTTP and RTSP.

The contents selection section 2207 has an interface for the user to input a URL and has a function of acquiring layout information according to the URL input by the user. At this time, suppose the contents selection section 2207 acquires a plurality of pieces of layout information.

Furthermore, the contents selection section 2207 also has a function of acquiring contents using HTTP and RTSP based on a URL described in layout information. At this time, the contents selection section 2207 requests that all media described in a plurality of pieces of layout information be acquired based on the acquired layout information.

Figure 23:
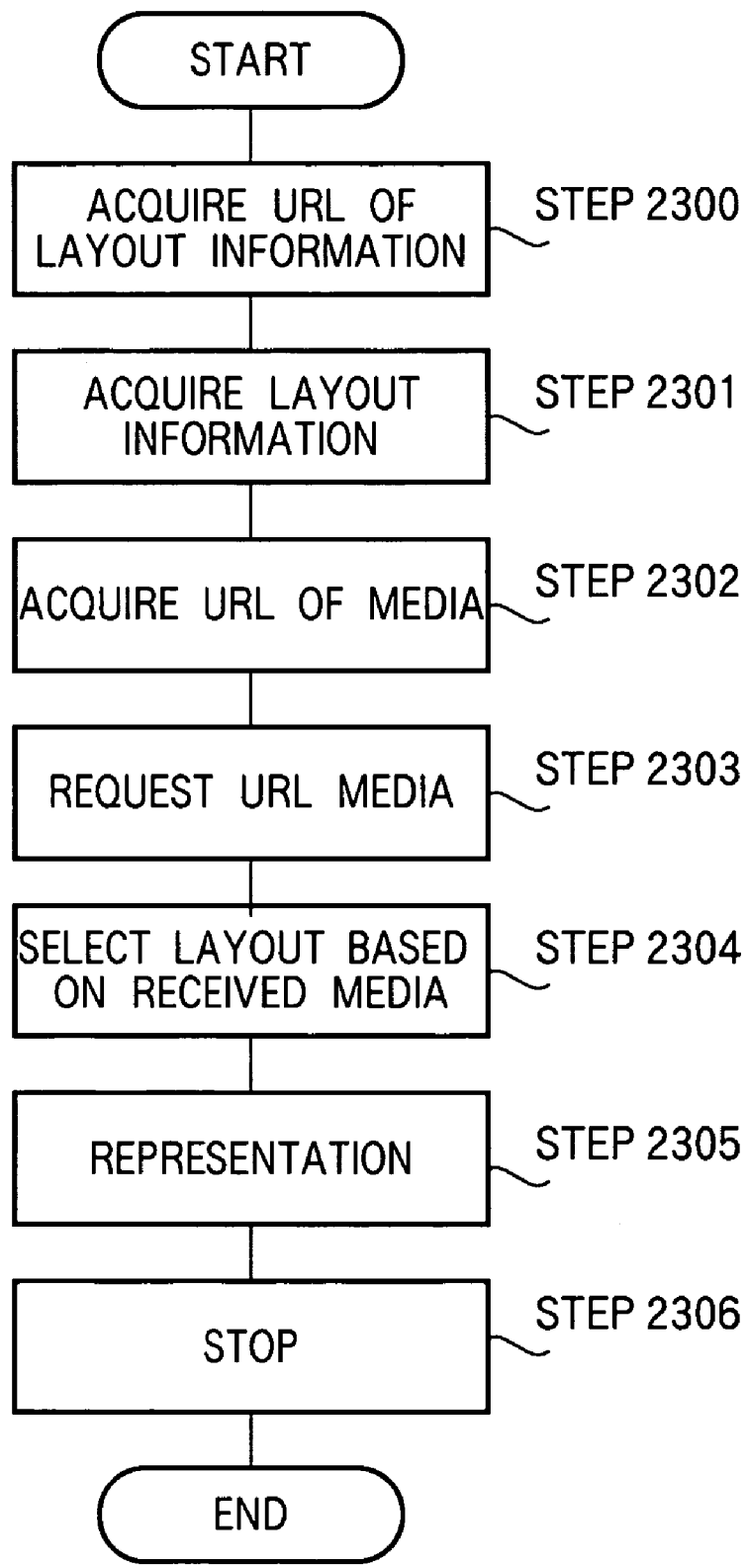
FIG. 23 is a flow chart illustrating the operation of a reception terminal according to Embodiment 2.

Next, the operation of the reception terminal 2211 according to Embodiment 2 will be explained using FIG. 23. FIG. 23 is a flow chart showing the operation of the reception terminal 2211 according to Embodiment 2.

First, the reception terminal 2211 acquires a URL of layout information input by the user at the contents selection section 2207 (step 2300).

Next, a reception control section 307 acquires layout information from the server 2206 through a transmission section 315 based on the URL acquired in step 2300 (step 2301).

At this time, suppose the reception control section 307 acquires a plurality of pieces of layout information and priorities of the pieces of the layout information are described in their respective pieces of the layout information.

Next, the reception control section 307 acquires a URL of media described in each piece of the layout information (step 2302) and transmits a transmission request for the media to the transmission section 315 based on the URL. Then, the transmission section 315 requests the server 2206 to transmit the media (step 2303).

Next, each piece of media data is transmitted from the server 2206 through the transmission section 315, and therefore the received data control section 318 selects a layout based on the media data that can be received (step 2304) and represents it (step 2305).

The method of selecting layout information is the same as that described in Embodiment 1.

Then, according to a representation stop instruction from the user, a representation control section 308 stops and ends representation (step 2306).

As described above, Embodiment 2 can realize a system in which the media distribution system according to Embodiment 1 is applied to contents of a communication type.

This application is based on the Japanese Patent Application No. 2003-064120 filed on Mar. 10, 2003, entire content of which is expressly incorporated by reference herein.

INDUSTRIAL APPLICABILITY

As described above, the server 102 sends a plurality of pieces of layout information and media to the reception terminal 104, and can thereby display contents made up of various media such as video, speech, still image, text transmitted from the reception terminal 104 in a mode appropriate for a reception state of media when the contents are displayed.

What is claimed is:

1. A reception apparatus that receives media data forming content, comprising:

a media transmitter that receives a plurality of items of media data and a plurality of items of layout information which specify display layouts of the plurality of items of media data, the plurality of items of layout information being associated with combinations of types of media data;

a reception controller that determines whether the plurality of items of media data can be represented;

a received data controller that selects layout information whereby media data contained in a display layout are determined to be capable of being represented, among the plurality of items of layout information; and a representation controller that represents the content using at least one media data based on the selected layout information, wherein each of the plurality of items of layout information has a mandatory flag which indicates whether individual media data contained in a display layout are mandatory to represent the content based on the layout information, and the received data controller selects layout information whereby all media data assigned the mandatory flag in a plurality of items of media data contained in the display layout are determined to be capable of being represented, among the plurality of items of layout information, wherein, in predetermined layout information in which the media data determined to be capable of being represented and media data determined to be not capable of being represented are contained in the display layout, when media data to which the mandatory flag is assigned to is contained in the media data determined to be not capable of being represented, the received data controller selects different layout information from the predetermined layout information among the plurality of items of layout information, and in other case, selects the predetermined layout information among the plurality of items of layout information.

2. The reception apparatus according to claim 1, wherein the layout information includes mandatory media data which comprises media data that is mandatory for representation; and the received data controller determines whether or not the received mandatory media data can be represented for the reception state, and selects the layout information whereby the received mandatory media data can be represented.

3. The reception apparatus according to claim 1, wherein the layout information includes priority of use information, and the received data controller selects the layout information having a highest priority of use information from among the plurality of items of layout information.

4. The reception apparatus according to claim 1, wherein the received data controller selects the layout information having a longest transmission interval at which layout information is transmitted from the transmitting side, from among the plurality of items of layout information.

5. The reception apparatus according to claim 1, wherein the received data controller selects the layout information ranking highest in order of description, from among the plurality of items of layout information, when the plurality of items of layout information are described in one item of program information.

6. The reception apparatus according to claim 1, wherein the received data controller selects the layout information having a largest number of the media data, from among the plurality of items of layout information.

7. The reception apparatus according to claim 1, wherein the received data controller selects the layout information including video media data, from among the plurality of items of layout information.

8. The reception apparatus according to claim 1,
wherein the reception controller measures a loss rate in a transmission path of the media data, and
wherein the received data controller selects an item of the layout information having a loss rate that is equal to or lower than a predetermined value, from among the plurality of items of layout information.

9. The reception apparatus according to claim 1, wherein the media transmitter receives the layout information and the media data with a media priority showing which media data is preferentially used when a plurality of media data are transmitted under a same transmission name.

10. A transmission apparatus that transmits media data forming content, comprising:

a media transmitter that transmits a plurality of items of media data and a plurality of items of layout information which specify display layouts of the plurality of items of media data, the plurality of items of layout information being associated with combinations of types of media data; and a program information generator that transmits an identifier which allows the content to be represented, based on layout information in which the media data forming the layout information can be represented, among the plurality of items of layout information, wherein each of the plurality of items of layout information has a mandatory flag which indicates whether individual media data contained in a display layout are mandatory to represent the content based on layout information such that the layout information can be selected in a transmission destination apparatus among the plurality of items of layout information, whereby all media data assigned the mandatory flag in the plurality of items of media data contained in the display layout are determined to be capable of being represented, and wherein, in the transmission destination apparatus that receives the layout information, in predetermined layout information in which media data determined to be capable of being represented and media data determined to be not capable of being represented are contained in the display layout, when media data to which the mandatory flag is assigned to is contained in the media data determined to be not capable of being represented, a received data controller of the transmission destination apparatus that receives the layout information selects different layout information from the predetermined layout information among the plurality of items of layout information, and in other case, selects the predetermined layout information among the plurality of items of layout information.

11. The transmission apparatus according to claim 10, wherein, when a plurality of different items of the layout information are transmitted, the media transmitter sets longer transmission intervals for layout information having a higher priority of use than for layout information having a lower priority of use.

12. The transmission apparatus according to claim 10, wherein the media transmitter transmits the media data making up the layout information with a media priority showing which media is preferentially used when a plurality of media are transmitted under a same transmission name.

13. A media distribution system that distributes media data forming content, comprising:
- a media data transmitter that transmits a plurality of items of media data and a plurality of items of layout information which specify display layouts of the plurality of items of media data, the plurality of items of layout information being associated with combinations of types of media data;
- a program information generator that transmits an identifier which allows the content to be represented, based on layout information in which the media data forming the layout information can be represented, amongst the plurality of items of layout information; and
- a reception apparatus that receives media data forming content, comprising:
- a media transmitter that receives a plurality of items of media data and a plurality of items of layout information which specify display layouts of the plurality of items of media data, the plurality of items of layout information being associated with combinations of types of media data;
- a reception controller that determines whether the plurality of items of media data can be represented;
- a received data controller that selects layout information whereby media data contained in a display layout are determined to be capable of being represented, among the plurality of items of layout information; and
- a representation controller that represents the content using at least one media data based on the selected layout information,
- wherein each of the plurality of items of layout information has a mandatory flag which indicates whether individual media data contained in a display layout are mandatory to represent the content based on layout information, such that the layout information can be selected in the reception apparatus among the plurality of items of layout information, whereby all media data assigned the mandatory flag in the plurality of items of media data contained in the display layout are determined to be capable of being represented, and
- wherein, in predetermined layout information in which the media data determined to be capable of being represented and media data determined to be not capable of being represented are contained in the display layout, when media data to which the mandatory flag is assigned to is contained in the media data determined to be not capable of being represented, the received data controller selects different layout information from the predetermined layout information among the plurality of items of layout information, and in other case, selects the predetermined layout information among the plurality of items of layout information.

14. An information browsing method, comprising:
- receiving a plurality of items of media data and a plurality of items of layout information which specify display layouts of the plurality of items of media data, the plurality of items of layout information being associated with combinations of types of media data;
- determining whether the plurality of items of media data can be represented;
- selecting layout information whereby media data contained in a display layout are determined to be capable of being represented, among the plurality of items of layout information; and
- representing content using at least one media data based on the selected layout information,
- wherein each of the plurality of items of layout information has a mandatory flag which indicates whether individual media data contained in a display layout are mandatory to represent the content based on the layout information,
- wherein the layout information is selected whereby all media data assigned the mandatory flag in a plurality of items of media data contained in the display layout are determined to be capable of being represented, among the plurality of items of layout information, and
- wherein, in predetermined layout information in which the media data determined to be capable of being represented and media data determined to be not capable of being represented are contained in the display layout, when media data to which the mandatory flag is assigned to is contained in the media data determined to be not capable of being represented, the received data controller selects different layout information from the predetermined layout information among the plurality of items of layout information, and in other case, selects the predetermined layout information among the plurality of items of layout information.

15. A media transmission method, comprising:
- transmitting a plurality of items of media data and a plurality of items of layout information which specify display layouts of the plurality of items of media data, the plurality of items of layout information being associated with combinations of types of media data; and
- transmitting an identifier which allows content to be represented, based on layout information in which the media data forming the layout information can be represented, among the plurality of items of layout information,
- wherein each of the plurality of items of layout information has a mandatory flag which indicates whether individual media data contained in a display layout are mandatory to represent the content based on layout information, such that the layout information can be selected at a transmission destination among the plurality of items of layout information, whereby all media data assigned the mandatory flag in the plurality of items of media data contained in the display layout are determined to be capable of being represented, and
- wherein, in the transmission destination that receives the layout information, in predetermined layout information in which media data determined to be capable of being represented and media data determined to be not capable of being represented are contained in the display layout, when media data to which the mandatory flag is assigned to is contained in the media data determined to be not capable of being represented, a received data controller of the transmission destination that receives the layout information selects different layout information from the predetermined layout information among the plurality of items of layout information, and in other case, selects the predetermined layout information among the plurality of items of layout information.

16. An information browsing method, comprising:
on the transmitting side:
- receiving a plurality of items of media data and a plurality of items of layout information which specify display layouts of the plurality of items of media data, the plurality of items of layout information being associated with combinations of types of media data;
- determining whether the plurality of items of media data can be represented;

selecting layout information whereby media data contained in a display layout are determined to be capable of being represented, among the plurality of items of layout information; and representing content using at least one media data based on the selected layout information;

on the receiving side:

transmitting a plurality of items of media data and a plurality of items of layout information which specify display layouts of the plurality of items of media data, the plurality of items of layout information being associated with combinations of types of media data; and transmitting an identifier which allows the content to be represented, based on layout information in which the media data forming the layout information can be represented, among the plurality of items of layout information, wherein each of the plurality of items of layout information has a mandatory flag which indicates whether individual media data contained in a display layout are mandatory to represent the content based on layout information such that the layout information can be selected on the receiving side among the plurality of items of layout information, whereby all media data assigned the mandatory flag in the plurality of items of media data contained in the display layout are determined to be capable of being represented, and wherein, in predetermined layout information in which the media data determined to be capable of being represented and media data determined to be not capable of being represented are contained in the display layout, when media data to which the mandatory flag is assigned to is contained in the media data determined to be not capable of being represented, the received data controller selects different layout information from the predetermined layout information among the plurality of items of layout information, and in other case, selects the predetermined layout information among the plurality of items of layout information.

17. A computer readable medium that stores a computer program enabling a computer to perform information browsing, the program causing the computer to execute:

receiving a plurality of items of media data and a plurality of items of layout information which specify display layouts of the plurality of items of media data, the plurality of items of layout information being associated with combinations of types of media data;

determining whether the plurality of items of media data can be represented;

selecting layout information whereby media data contained in a display layout are determined to be capable of being represented, among the plurality of items of layout information; and representing content using at least one media data based on the selected layout information, wherein each of the plurality of items of layout information has a mandatory flag which indicates whether individual media data contained in a display layout are mandatory to represent the content based on the layout information, and wherein the layout information is selected whereby all media data assigned the mandatory flags contained in the display layout are determined to be capable of being represented, among the plurality of items of layout information, and wherein, in predetermined layout information in which the media data determined to be capable of being represented and media data determined to be not capable of being represented are contained in the display layout, when media data to which the mandatory flag is assigned to is contained in the media data determined to be not capable of being represented, the received data controller selects different layout information from the predetermined layout information among the plurality of items of layout information, and in other case, selects the predetermined layout information among the plurality of items of layout information.

18. A computer readable medium that stores a computer program enabling a computer to perform media transmission, the program causing the computer to execute:

transmitting a plurality of items of media data and a plurality of items of layout information which specify display layouts of the plurality of items of media data, the plurality of items of layout information being associated with combinations of types of media data; and transmitting an identifier which allows content to be represented, based on layout information in which the media data forming the layout information can be represented, amongst the plurality of items of layout information, wherein each of the plurality of items of layout information has a mandatory flag which indicates whether individual media data contained in a display layout are mandatory to represent the content based on layout information such that the layout information can be selected at a transmission destination among the plurality of items of layout information, whereby all media data assigned the mandatory flag in the plurality of items of media data contained in the display layout are determined to be capable of being represented, and wherein, in the transmission destination that receives the layout information, in predetermined layout information in which media data determined to be capable of being represented and media data determined to be not capable of being represented are contained in the display layout, when media data to which the mandatory flag is assigned to is contained in the media data determined to be not capable of being represented, a received data controller of the transmission destination that receives the layout information selects different layout information from the predetermined layout information among the plurality of items of layout information, and in other case, selects the predetermined layout information among the plurality of items of layout information.

* * * * *